(12) United States Patent
Diao et al.

(10) Patent No.: US 12,170,753 B2
(45) Date of Patent: Dec. 17, 2024

(54) MULTI-VIEWPOINT 3D DISPLAY SCREEN AND 3D DISPLAY TERMINAL

(71) Applicants: Beijing Ivisual 3D Technology Co., Ltd., Beijing (CN); VISIOTECH VENTURES PTE. LTD., Singapore (SG)

(72) Inventors: Honghao Diao, Beijing (CN); Lingxi Huang, Beijing (CN)

(73) Assignees: Beijing Ivisual 3D Technology Co., Ltd., Beijing (CN); VISIOTECH VENTURES PTE. LTD., Singapore (SG)

( * ) Notice: Subject to any disclaimer, the term of this patent is extended or adjusted under 35 U.S.C. 154(b) by 274 days.

(21) Appl. No.: 17/781,386

(22) PCT Filed: Dec. 2, 2020

(86) PCT No.: PCT/CN2020/133334
§ 371 (c)(1),
(2) Date: Jun. 1, 2022

(87) PCT Pub. No.: WO2021/110040
PCT Pub. Date: Jun. 10, 2021

(65) Prior Publication Data
US 2023/0027136 A1    Jan. 26, 2023

(30) Foreign Application Priority Data
Dec. 5, 2019   (CN) .......................... 201911231362.0

(51) Int. Cl.
*H04N 13/32*    (2018.01)
*H04N 13/324*   (2018.01)
*H04N 13/383*   (2018.01)

(52) U.S. Cl.
CPC .......... *H04N 13/32* (2018.05); *H04N 13/324* (2018.05); *H04N 13/383* (2018.05)

(58) Field of Classification Search
CPC ..... H04N 13/32; H04N 13/324; H04N 13/383
See application file for complete search history.

(56) References Cited

U.S. PATENT DOCUMENTS

2014/0055561 A1   2/2014 Tsukagoshi
2015/0309319 A1*  10/2015 Wei ...................... H04N 13/351
                                                          359/569
(Continued)

FOREIGN PATENT DOCUMENTS

CN      102169236 A    8/2011
CN      103235415 A    8/2013
(Continued)

OTHER PUBLICATIONS

International Search Report for corresponding application PCT/CN2020/133334 filed Dec. 2, 2020; Mail date Feb. 25, 2021.

*Primary Examiner* — Mohamed A. Wasel
(74) *Attorney, Agent, or Firm* — Samson G. Yu

(57) ABSTRACT

Provided is a multi-viewpoint 3D display screen, comprising: a display panel, comprising a plurality of composite pixels, wherein each composite pixel of the plurality of composite pixels comprises a plurality of composite subpixels, and each composite subpixel of the plurality of composite subpixels comprises a plurality of subpixels corresponding to a plurality of viewpoints of the multi-viewpoint 3D display screen; and a grating, directly bonded to the display panel. In the multi-viewpoint 3D display screen, the grating without a pad layer can be realized, and meanwhile, a 3D viewing effect under a predetermined distance is ensured, and an overall thickness and weight are reduced, (Continued)

thereby being convenient for installation and transportation.
A 3D display terminal is also provided.

18 Claims, 12 Drawing Sheets

(56) References Cited

U.S. PATENT DOCUMENTS

| | | | | |
|---|---|---|---|---|
| 2016/0246065 | A1* | 8/2016 | Wei | G02F 1/13471 |
| 2018/0196273 | A1* | 7/2018 | Wu | G02B 30/27 |
| 2018/0292647 | A1* | 10/2018 | Fattal | G02B 27/0101 |
| 2019/0373239 | A1* | 12/2019 | Liu | H04N 13/305 |
| 2021/0223568 | A1* | 7/2021 | Makinen | G02B 27/30 |
| 2023/0375841 | A1* | 11/2023 | Kress | G02B 27/0172 |

FOREIGN PATENT DOCUMENTS

| | | |
|---|---|---|
| CN | 103747227 A | 4/2014 |
| CN | 104965308 A | 10/2015 |
| CN | 108181720 A | 6/2018 |
| CN | 211128026 U | 7/2020 |
| CN | 211528831 U | 9/2020 |

* cited by examiner

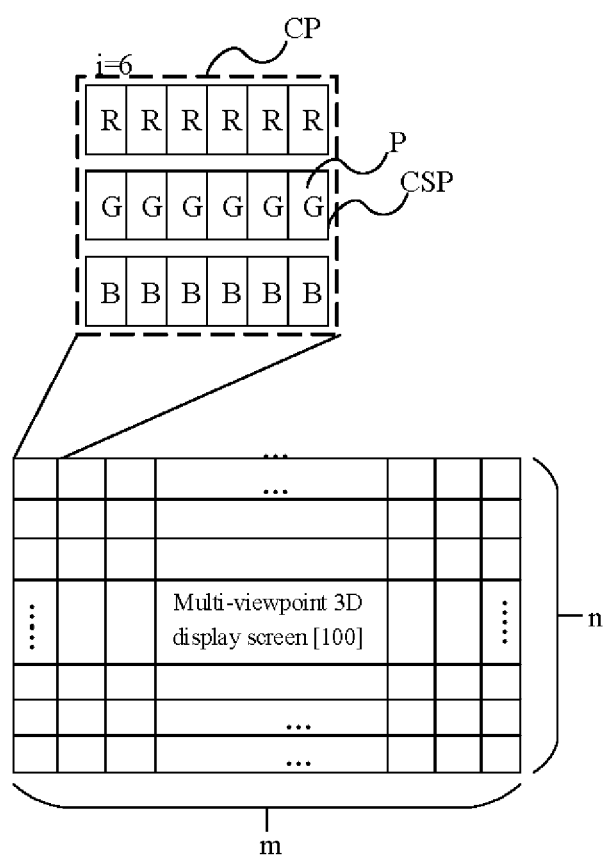

MULTI-VIEWPOINT 3D DISPLAY SCREEN AND 3D DISPLAY TERMINAL

The present disclosure claims priority to the Chinese Patent Application with an application number of 2019112313620 and a title of "Multi-Viewpoint Naked-eye 3D Display Screen and Naked-eye 3D Display Terminal", filed to China National Intellectual Property Administration on Dec. 5, 2019, the disclosures of which are hereby incorporated by reference.

TECHNICAL FIELD

The present disclosure relates to the field of 3D images, and for example, relates to a multi-viewpoint 3D display screen and a 3D display terminal.

BACKGROUND

In a structure of a conventional 3D display screen, gratings are only arranged on one side or both sides of a 2D display panel to provide a 3D display effect, while both transmission and display of 3D images or videos are based on the 2D display panel. The dilemma problems of reduction of resolution and sharp increase of a calculating amount of rendering are caused. Meanwhile, a thickness of the display panel is also increased, and particularly, for a large-sized display panel, the overall mass of the panel is increased due to the increase of the thickness, leading to the problems of installation and transportation when in use.

The background is only for the convenience of understanding related technologies in the field, and is not regarded as an acknowledgment of the existing technology.

SUMMARY

In order to provide a basic understanding of some aspects of the disclosed embodiments, a brief summary of some embodiments is given below. The brief summary is not intended to identify key/important components or describe the scope of protection of the present invention, but to be a preface to the following detailed description.

Embodiments of the present disclosure provide a multi-viewpoint 3D display screen and a 3D display terminal, so as to overcome or relieve at least some of the above mentioned problems.

In some embodiments, a multi-viewpoint 3D display screen is provided, comprising: a display panel, comprising a plurality of composite pixels, wherein each composite pixel of the plurality of composite pixels comprises a plurality of composite subpixels, and each composite subpixel of the plurality of composite subpixels comprises a plurality of subpixels corresponding to a plurality of viewpoints of the multi-viewpoint 3D display screen; and a grating, directly bonded to the display panel.

In some embodiments, a width p of each subpixel of the plurality of subpixels is constructed as: $p \leqslant (d \times q)/(n \times D)$, wherein d represents a sum of a thickness of the display panel and a thickness of the grating; q represents a reference distance of an interpupillary distance; D represents a preset viewing distance of the multi-viewpoint 3D display screen; and n represents a refractive index of the grating.

In some embodiments, $1.3 \leqslant n \leqslant 1.6$.

In some embodiments, $n = 1.46$.

In some embodiments, each composite subpixel comprises a plurality of subpixels that are arranged in a single row or a single column; or each composite subpixel comprises a plurality of subpixels that are arranged in a form of array.

In some embodiments, the plurality of composite subpixels comprise at least one of red composite subpixels, green composite subpixels and blue composite subpixels.

In some embodiments, a size of the multi-viewpoint 3D display screen is greater than or equal to 43 inches.

In some embodiments, a size of the multi-viewpoint 3D display screen is 55 inches, 60 inches, 80 inches or 100 inches; or the multi-viewpoint 3D display screen is a cinema screen.

In some embodiments, a width of each subpixel of the plurality of subpixels is less than 0.008 mm.

In some embodiments, a width of each subpixel of the plurality of subpixels is less than 0.0076 mm.

In some embodiments, the display panel comprises: a first substrate; a second substrate, arranged at an interval with the first substrate; a color filter, attached to a surface, facing the second substrate, of the first substrate; a Thin Film Transistor (TFT), attached to a surface, facing the first substrate, of the second substrate; a polarizer, attached to a surface, away from the first substrate, of the second substrate; and a liquid crystal layer, arranged between the first substrate and the second substrate, wherein the grating is directly jointed to a surface, away from the second substrate, of the first substrate.

In some embodiments, the grating is obliquely bonded to the display panel.

In some embodiments, the grating comprises a plurality of cylindrical prism gratings.

In some embodiments, a 3D display terminal is provided, comprising the above multi-viewpoint 3D display screen.

In some embodiments, the 3D display terminal further comprises a 3D processing device, configured to render corresponding subpixels in the plurality of composite subpixels in the multi-viewpoint 3D display screen based on 3D signals.

In some embodiments, the 3D processing device is further configured to perform displacement rendering for subpixels in composite subpixels according to viewpoint positions corresponding to subpixels rendered currently and viewpoint positions corresponding to subpixels rendered subsequently.

In some embodiments, the 3D display terminal further comprises a memory, configured to store corresponding relationships of subpixels and viewpoints, wherein the 3D processing device is configured to acquire the corresponding relationships.

In some embodiments, the 3D display terminal further comprises an eye positioning data acquisition device, configured to acquire eye positioning data of a user.

In the multi-viewpoint 3D display screen and the 3D display terminal in the present disclosure, the grating can be directly combined onto the display panel, thereby effectively reducing the thickness and weight of the multi-viewpoint 3D display screen and the 3D display terminal.

The above general description and the description below are exemplary and explanatory only, and are not intended to limit the present disclosure.

DESCRIPTION OF DRAWINGS

One or more embodiments are illustrated by the corresponding drawings, and the illustrations and drawings do not limit the embodiments. Elements having the same reference numerals in the drawings are shown as similar elements, and the drawings are not intended to limit the scale, wherein:

FIGS. 1A-1D are structural schematic diagrams of a multi-viewpoint 3D display screen and a 3D display terminal according to embodiments of the present disclosure;

REFERENCE NUMERALS

100: multi-viewpoint 3D display screen; CP: composite pixel; CSP: composite subpixel; P: subpixel; 1000: 3D display terminal; 101: processor; 122: register; 130: 3D processing device; 131: buffer; 140: video signal interface; 150: eye positioning device; 160: eye positioning data interface; 200: 3D display terminal; 201: processor; 202: external memory interface; 203: memory; 204: USB interface; 205: charging management module; 206: power supply management module; 207: battery; 208: mobile communication module; 209: antenna; 210: wireless communication module; 211: antenna; 212: audio module; 213: loudspeaker; 214: telephone receiver; 215: microphone; 216: earphone jack; 217: key; 218: motor; 219: indicator; 220: SIM card interface; 221: shooting unit; 222: register; 223: GPU; 224: codec; 230: sensor module; 2301: proximity light sensor; 2302: ambient light sensor; 2303: pressure sensor; 2304: air pressure sensor; 2305: magnetic sensor; 2306: gravity sensor; 2307: gyroscope sensor; 2308: acceleration sensor; 2309: distance sensor; 2310: temperature sensor; 2311: fingerprint sensor; 2312: touch sensor; 2313: bone conduction sensor; 310: application program layer; 320: framework layer; 330: core class library and Runtime; 340: kernel layer; 400: composite pixel; 410, 420, 430, 440, 450, 460, 470, 480 and 490: composite subpixels; 411, 421, 431, 441, 451, 461, 471, 481 and 491: subpixels; 501 and 502: two images in a parallel format; 503 and 504: two images in an up-down format; 505: composite image in a left-right interlaced format; 506: composite image in an up-down interlaced format; 507: composite image in a checkerboard format; D: distance between surface of display screen and eyes; d: thickness of display screen; q: distance between two eyes; p: distance between adjacent pixels; n': refractive index in air; n: refractive index of grating; θ1: included angle between emergent ray and normal of lens; θ2: included angle between incident ray and normal of lens; 800: multi-viewpoint 3D display screen; 810: display panel; 820: grating; 811: display TFT layer; and 812: polarizer.

DETAILED DESCRIPTION

For more detailed understanding of characteristics and technical contents of embodiments of the present disclosure, the implementation of the embodiments of the present disclosure will be described in detail below with reference to the accompanying drawings, and the accompanying drawings are used for reference only, instead of limiting the embodiments of the present disclosure.

Figure 7A:
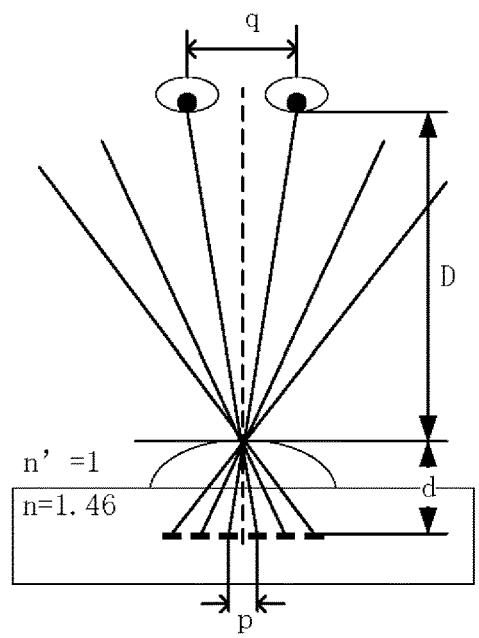
FIG. 7A is a schematic diagram of 3D optical imaging of the multi-viewpoint 3D display screen according to the embodiments of the present disclosure.

FIG. 7A shows a schematic diagram of optical paths of imaging of a multi-viewpoint 3D display screen (such as: a multi-viewpoint naked eye 3D display screen), and if an audience views 3D contents at a distance of D from the screen, a thickness d required by the multi-viewpoint 3D display screen may be calculated according to geometrical relationships of rays. For any ray emitted by the display screen, the ray enters air at θ1 (θ1 shown in FIG. 7B) and finally enters eyes of the audience. Parameters in the figure are expressed as: D represents a distance between the surface of the display screen and the eyes; d represents the thickness of the display screen; q represents a distance between the two eyes; p represents a distance between adjacent pixels; n' represents a refractive index in air; and n represents a refractive index of the grating.

Figure 7B:
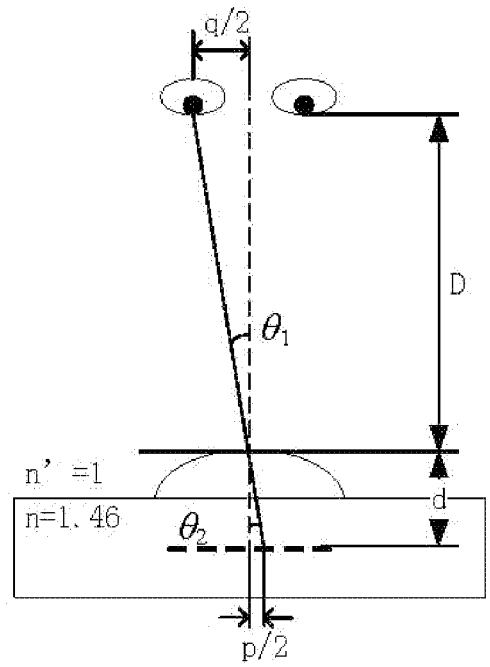
FIG. 7B is a schematic diagram of optical paths of a lens zone of the multi-viewpoint 3D display screen according to the embodiments of the present disclosure.

FIG. 7B is an amplified schematic diagram of a ray at a lens, and a ray emitted by the multi-viewpoint 3D display screen penetrates through any point of a convex lens, enters air and then finally enters the eyes of a user. The included angle between an incident ray and a normal of the lens is θ2, the included angle between an emergent ray and the normal of the lens is θ1, and the following formula is defined according to a refractive index:

$$\frac{n}{n'} = \frac{1.46}{1} = \frac{\sin\theta_1}{\sin\theta_2} \qquad (1)$$

The included angle between the emergent ray/the incident ray and the normal is smaller, thus:

$$\lim_{\theta_1 \to 0} \frac{\sin\theta_1}{\sin\theta_2} = \frac{\theta_1}{\theta_2} = \frac{\tan\theta_1}{\tan\theta_2} \qquad (2)$$

According to the formulas ① and ②, $$\frac{\sin\theta_1}{\sin\theta_2} = \frac{\tan\theta_1}{\tan\theta_2} = \frac{1.46}{1}$$

is obtained, so that:

$$\frac{\tan\theta_1}{\tan\theta_2} = \frac{1.46}{1} \qquad (3)$$

In FIG. 7A, $$\tan\theta_1 = \frac{-q}{D}, \text{ and } \tan\theta_2 = \frac{-p}{d};$$

according to ③, the following equality relationship is obtained:

$$\frac{\tan\theta_1}{\tan\theta_2} = \frac{1.46}{1} = \frac{-q}{D}:\frac{-p}{d} \qquad ④$$

Generally, the diagonal line of a 55-inch display screen is 55 inches, which is 1,397 mm. Generally, if a length-width ratio is 16:9, a length is 1,218 mm, and a width is 685 mm. A 4K display screen has 3,840×2,160 pixels. The dimension of each pixel: a length is 1,218/3,840=0.317 mm, and a width is 685/2,160=0.317 mm. A width of the pixel of the display screen is about 0.317 mm. Further, according to RGB three-color splitting (standard RGB arrangement), a width of the subpixel is 0.106 mm, p=0.106 mm (a pitch of the subpixels of the 55-inch 4K display screen), D=5 m (a comfortable distance for viewing a 3D display effect of the 55-inch display screen), and q=0.062 m (an average distance between pupils of two eyes of an Asian).

According to ④, $$d = \frac{1.46*D*p}{q} = \frac{1.46*5*0.106}{0.062} \approx 12.4 \text{ mm} \qquad ⑤$$

Figure 8:
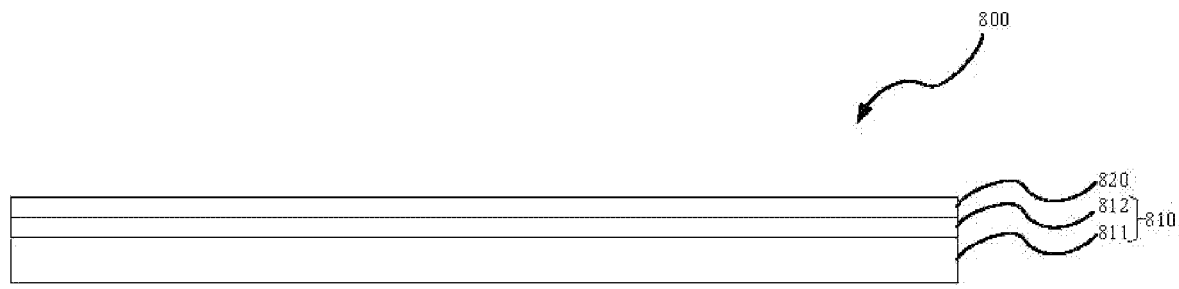
FIG. 8 is a structural schematic diagram of a multi-viewpoint 3D display screen according to the embodiments of the present disclosure.

FIG. 8 shows a structure of a multi-viewpoint 3D display screen 800, and comprises a display panel 810 and a grating 820; the display panel 810 comprises a display TFT layer 811 and a polarizer 812; a thickness of the display TFT layer 811 is 0.5 mm; a thickness of the polarizer 812 is 0.1 mm; a thickness of the grating 820 is 0.3 mm; and an overall thickness is 0.9 mm, which is short of 11.5 mm through comparison with a thickness of 12.4 mm required by a comfortable display effect; generally, a pad layer (a glass gasket) with a supplementary thickness needs to be added between the display panel and the grating; however, sizes of mainstream television screens are over 50 inches and 55 inches at present, a technique of attaching large-sized glass onto the display screen is extremely high in difficulty, and the weight of the display screen is larger. In addition, a thickness of the display screen is obviously increased, so that an installation space is occupied; and due to the increase of the weight, a corresponding thickness needs to be additionally increased for the display screen and an installation structure of the display screen, or a corresponding installation structure needs to be independently designed, thereby causing the problems of inconvenience in use and production of multiple specifications.

Embodiments of the present disclosure provide a novel design for a pixel structure. Equivalently, an existing TFT pixel is split into a plurality of TFT pixels, and the same 3D display effect may be realized at a predetermined distance under the condition of not increasing the thicknesses of the display panel and the display screen.

According to ④, $$p = \frac{d*q}{1.46*D} \qquad ⑥$$

Under the condition of not changing the thickness of the display screen, d=0.9 mm. Other values are not changed, D=5 m, q=0.062 m, and n=1.46; and the values are substituted into ⑥, and the changed p value is solved, which is set as p'.

$$p' = \frac{d*q}{1.46*D}* = \frac{0.9*0.062}{1.46*5} = 0.0076 \text{ mm} \qquad ⑦$$

According to a calculating result of ⑦, when a pitch of the subpixels of the multi-viewpoint 3D display screen is split into the pixels from the original 0.106.4 mm to about 0.0076 mm, the thickness of the display screen does not need to be increased artificially, and the same 3D display effect may be realized.

After the above pixels are split, the pad layer does not need to be further added between the display panel and the grating in the multi-viewpoint 3D display screen, and the predetermined distance can be achieved, so as to realize the same 3D display effect.

Figure 9A:
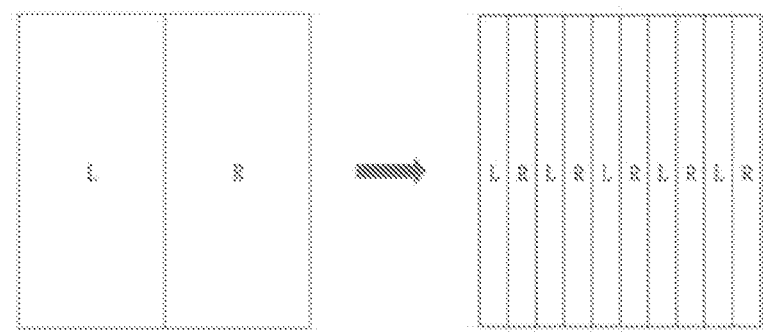
FIGS. 9A-9B are schematic diagrams of splitting pixels of the multi-viewpoint 3D display screen according to the embodiments of the present disclosure.
Figure 9B:
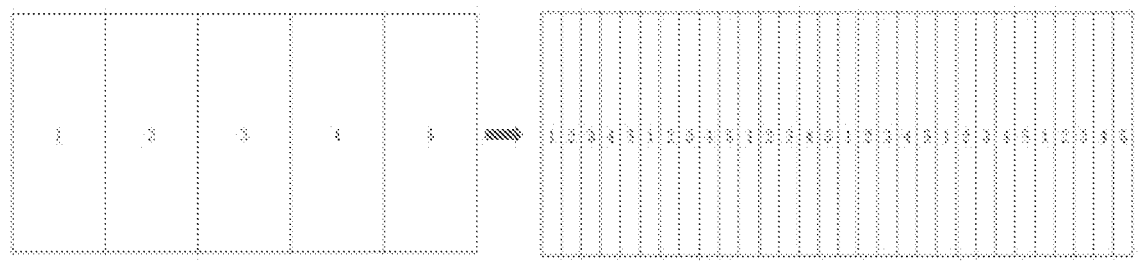
Figure 10:
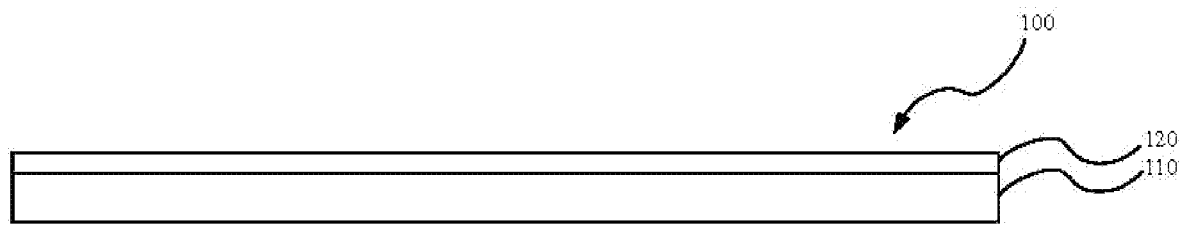
FIG. 10 is a structural schematic diagram of a multi-viewpoint 3D display screen according to the embodiments of the present disclosure.

Manners of splitting the TFT pixel are shown in FIG. 9A and FIG. 9B, and a multi-view 3D display effect may be realized by independently controlling left views and right views.

A splitting manner of a first pixel is shown in FIG. 9A. Every two adjacent pixels are in one group, and each group includes the left views and the right views. The pixels marked with L show the left views, and the pixels marked with R show the right views.

A splitting manner of a second pixel is shown in FIG. 9B, every N pixels are in one group, and for example, N is 5. In the figure, the pixels marked with same number show the left views or the right views simultaneously or in a time sharing manner, so as to realize 3D display.

The introduction for the above embodiments contrastively illustrates that how the pitch between the subpixels affects the thickness of the display screen; and in an actual application process of the 3D display screen, the pitch between the subpixels can be ensured, and namely, a thickness of the display terminal and the thickness of the display screen may be ensured, so as to avoid additional increase of the pad layer. Meanwhile, as the quantity of the subpixels is multiplied after being split, a 2D display screen which has the same size as the 3D display screen has multiplied display resolution. For example, if the display resolution of the 2D display screen with the same size is M1×N1, the display resolution of the 3D display screen with the same size is INT(T/i)×M1×N1, wherein INT represents an integral function, T represents the multiple of splitting, such as 14, and i represents the number of viewpoints, and for example, is 2 or 5 or 7.

In some embodiments of the present disclosure, as shown in FIGS. 10 and 1A-1C, a multi-viewpoint 3D display screen 100 is provided, comprising a display panel 110 and a grating 120 arranged on the display panel 110; m×n composite pixels CP are arranged on the display panel 110, so as to define display resolution of m×n; the composite pixels CP comprise a plurality of rows of composite subpixels CSP; each row of composite subpixels CSP is composed of i subpixels P corresponding to i viewpoints, and i ≥ 3; and the color of the subpixels in each row of composite subpixels CSP may be set as the same. The size of the multi-viewpoint 3D display screen in the embodiments is the same as a size of the 2D display screen with the same size and display resolution, and accordingly, a pitch between the subpixels P in the composite pixels CP in the embodiments is smaller than a pitch between subpixels in the 2D display screen with the same display resolution; and for example, the above embodiment of splitting the pixels of the 55-inch display screen realizes the resolution of 4 k relative to the 55-inch 2D display screen, and a pitch between the subpixels P in the embodiment is 0.0076 mm, which is approximately decreased by 14 times, thereby realizing an effect without the pad layer. The display screen in the present disclosure can be particularly applied in a scenario of a large-sized display screen, such as a display screen with a size of over 50 inches, so that the weight can be effectively reduced.

In the embodiments of the present disclosure, the grating may be directly bonded to the display panel.

According to the above embodiments, it may be known that a thickness of the pad layer may be adjusted by adjusting a pitch between the subpixels until the pad layer is removed; and further, a pitch between the subpixels P is configured to attach the grating 120 directly to the display panel 110.

In some embodiments, a pitch p between the subpixels P meets the following relation: $p \leqslant (d \times q)/(n \times D)$, wherein d represents a sum of a thickness of the display panel and a thickness of the grating; q represents the average distance between pupils of two eyes; D represents a predetermined viewing distance of the multi-viewpoint 3D display screen; n represents the refractive index of the grating, and for example, $1.3 \leqslant n \leqslant 1.6$; and in some occasions that the structure and a material of the display screen are set, n=1.46. In the embodiments of the present disclosure, a width of the subpixel is set as above, so that the grating may be directly combined onto the display panel, and a height of the pad layer is zero, so as to realize the effect without the pad layer.

In some embodiments, a width of the subpixel in each composite subpixel is less than 0.008 mm, or less than 0.0076 mm.

In some embodiments, each composite subpixel comprises a single row or a single column of a plurality of subpixels.

In some embodiments, each composite subpixel comprises a plurality of subpixels in a form of array.

In some embodiments, the plurality of composite subpixels comprise red composite subpixels, green composite subpixels and blue composite subpixels.

In some embodiments, a size of the multi-viewpoint 3D display screen is greater than or equal to 43 inches, such as 50 inches, 55 inches, 60 inches, 80 inches, 100 inches, 110 inches and the like.

In some embodiments, the multi-viewpoint 3D display screen is a Micro-Led display screen. The above TFT layer comprises a driving circuit and a light-emitting circuit of a Micro-LED.

In some embodiments of the present disclosure, for an overall pixel width of the composite pixels CP, a width of each grid of the grating is set; generally, for the requirement of no pad layer, a pitch between the subpixels is acquired after calculation, and namely, a width of each grid of the grating may be determined according to the number of the subpixels in the composite subpixels; and for example, if the composite subpixels comprise i subpixels, a width of each grid of the grating is i×p.

In the embodiments of the present disclosure, the display panel 110 may be a liquid crystal panel, and specifically, the display panel 110 comprises: a pair of substrates separated from each other; a color filter attached to a surface, facing a second substrate, of a first substrate in the pair of substrates; a TFT attached to a surface, facing the first substrate, of the second substrate; another polarizer attached to a surface, away from the first substrate, of the second substrate; and a liquid crystal layer arranged between the pair of substrates, wherein the grating 120 is directly jointed to a surface, away from the second substrate, of the first substrate.

In summary of the embodiments of the present disclosure, a plurality of cylindrical prism gratings in the grating 120 are parallelly and obliquely bonded to the display panel, so as to prevent generation of moire patterns.

According to the above embodiments of the present disclosure, the present disclosure further relates to a 3D display screen which has the same size as a 2D display screen; and a subpixel zone in the original 2D display screen is split into one, two or a plurality of composite pixels, so as to realize an effect without a pad layer. For example, in the above embodiment of splitting the pixels of the 55-inch display screen, the original subpixel is split into 14 subpixels, and for the condition that viewpoints are 2, 7 composite pixels may be utilized for displaying one pixel point in the original 2D display screen; if the same resolution needs to be ensured, subpixels corresponding to viewpoints i in the 7 composite pixels are configured to display same color brightness; and if the resolution needs to be multiplied, the subpixels corresponding to the viewpoints i in the 7 composite pixels may be configured to display different color brightness, and the specific color brightness may be acquired by calculating the color brightness of surrounding pixel points. If the viewpoints are 5, due to an aliquant condition, the 14 subpixels are distributed into 2 composite pixels, and the number of viewpoints in each composite pixel is 7, and namely, each composite subpixel comprises 7 subpixels; and redundant subpixels may be controlled to be not displayed, or non-interfering color brightness is displayed. Accordingly, grids of a grating may not cover the subpixels that are not displayed; at the moment, if same-resolution display is required, the subpixels corresponding to the viewpoints i in the 2 composite pixels may display the same color brightness; and if the resolution needs to be multiplied, the color brightness of the two subpixels may be set according to the color brightness of surrounding subpixels.

In some embodiments of the present disclosure, a 3D display terminal 1000 is provided, comprising: the multi-viewpoint 3D display screen 100, comprising m×n composite pixels CP, so as to define the display resolution of m×n; a video signal interface 140, used for receiving video frames of 3D video signals, wherein each video frame of the 3D video signals includes two images with the resolution of m×n or includes a composite image with the resolution of 2m×n or m×2n; and at least one 3D processing device 130.

In some embodiments, each composite pixel CP comprises a plurality of composite subpixels CSP, and each composite subpixel is composed of i subpixels of the same color, corresponding to i viewpoints, wherein $i \geqslant 3$.

In some embodiments, the at least one 3D processing device 130 is configured to render at least one subpixel in each composite subpixel based on one of the two images, and render at least another subpixel in each composite subpixel based on the other one of the two images.

In some other embodiments, the at least one 3D processing device 130 is configured to render at least two subpixels in each composite subpixel based on composite images.

In some embodiments, the 3D processing device 130 is configured to render the subpixels, corresponding to the viewpoints, in the composite pixels based on 3D image signals.

Figure 1B:
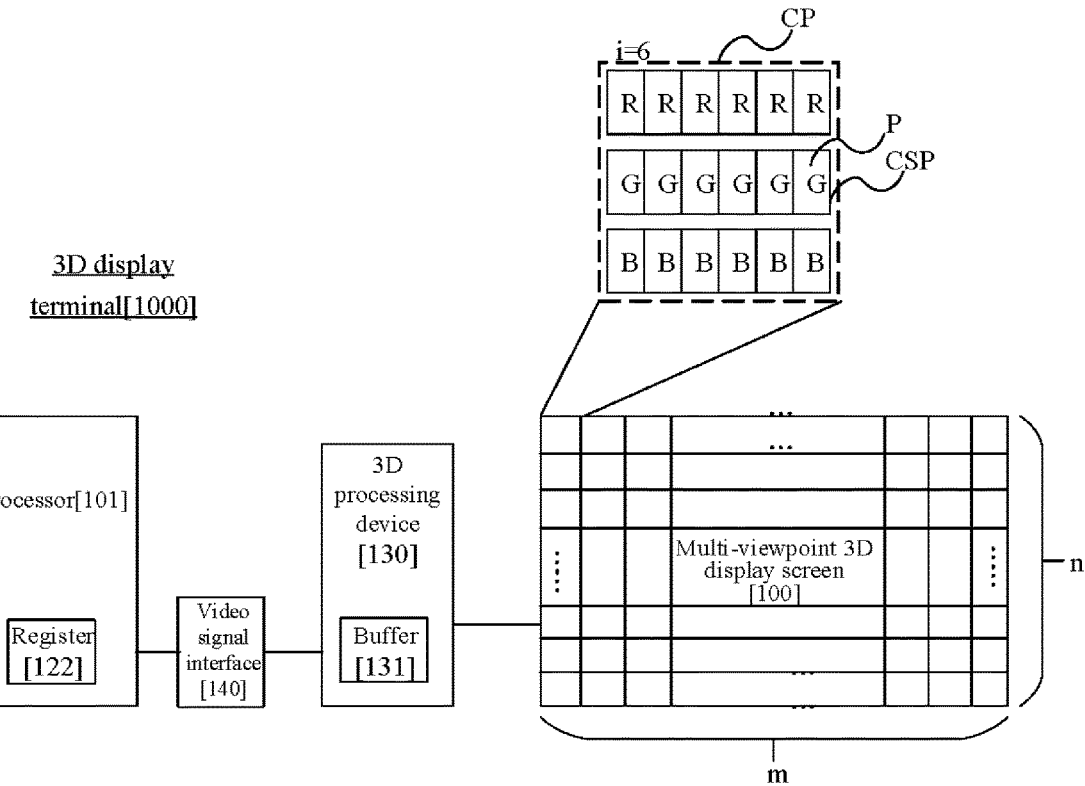

FIG. 1A shows a schematic diagram of the multi-viewpoint 3D display screen (such as: the multi-viewpoint naked eye 3D display screen) according to an embodiment of the present disclosure, and FIG. 1B shows a structural schematic diagram of the 3D display terminal 1000 provided by an embodiment of the present disclosure. With reference to FIG. 1A and FIG. 1B, the 3D display terminal 1000 is provided in an embodiment of the present disclosure, and may comprise the multi-viewpoint 3D display screen 100, at least one 3D processing device 130 and the video signal interface 140 used for receiving the video frames of the 3D video signals.

In the embodiments shown in FIG. 1A and FIG. 1B, the multi-viewpoint 3D display screen 100 may comprise the m×n composite pixels, so as to define the display resolution of m×n. As shown in FIG. 1A and FIG. 1B, the multi-viewpoint 3D display screen 100 comprises m columns and n rows of composite pixels CP, so as to define the display resolution of m×n.

In some embodiments, each composite pixel CP comprises a plurality of composite subpixels, and each composite subpixel is composed of i subpixels of the same color, corresponding to i viewpoints, wherein i⩾2. In the embodiment shown in FIG. 1A, i=6, but it may be contemplated that i may be other numerical values. In the shown embodiment, the multi-viewpoint 3D display screen may correspondingly have i (i=6) viewpoints (V1-V6), but it may be contemplated that the multi-viewpoint 3D display screen may correspondingly have more or less viewpoints.

Figure 4A:
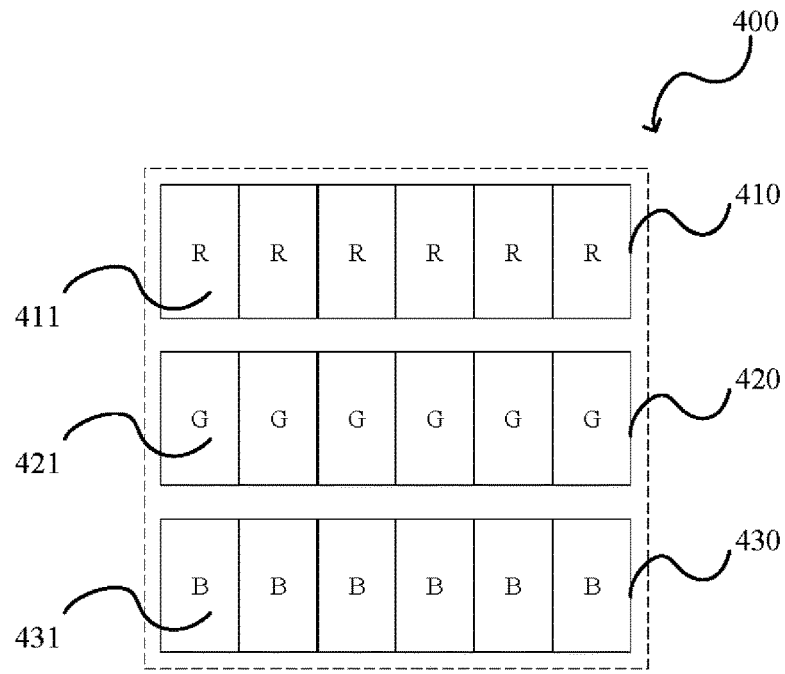
FIGS. 4A-4C are schematic diagrams of a composite pixel according to the embodiments of the present disclosure.

With reference to FIG. 1A and FIG. 4A, in the shown embodiments, each composite pixel comprises three composite subpixels, and each composite subpixel is composed of 6 subpixels of the same color, corresponding to 6 (i=6) viewpoints. The three composite subpixels respectively correspond to three colors: red (R), green (G) and blue (B). In other words, the three composite subpixels of each composite pixel respectively have 6 red subpixels, 6 green subpixels or 6 blue subpixels.

In the embodiments shown in FIG. 1A and FIG. 4A, composite subpixels 410, 420 and 430 in a composite pixel 400 are parallelly arranged. The composite subpixels 410, 420 and 430 respectively comprise subpixels 411, 421 and 431 in a form of a single row. However, it may be thought of different arrangement manners of the composite subpixels in the composite pixels or different arrangement forms of the subpixels in the composite subpixels.

Figure 4B:
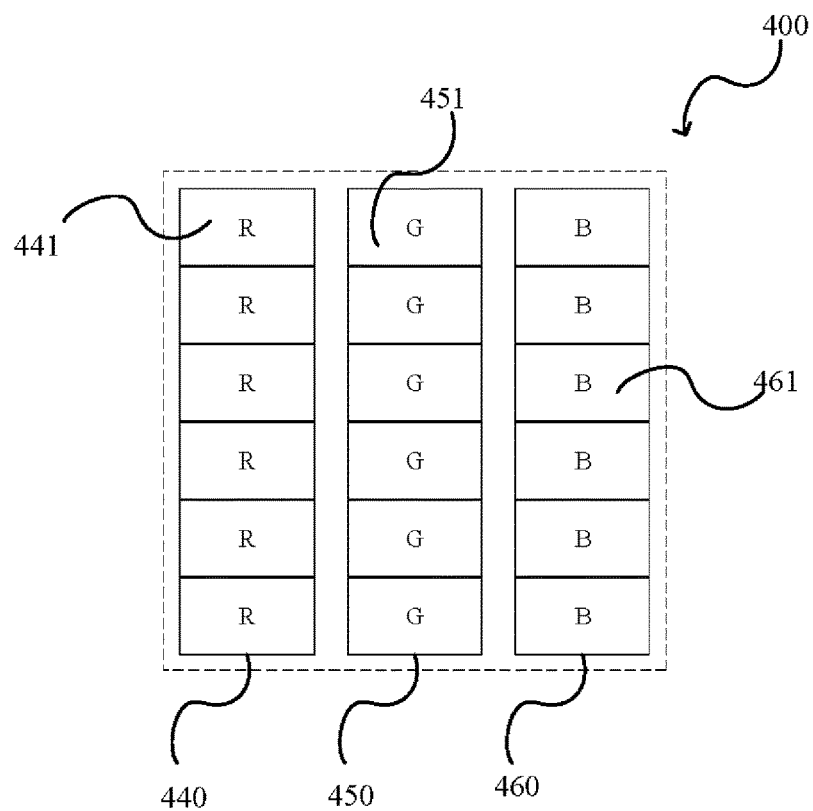

As shown in FIG. 4B, each of composite subpixels 440, 450 and 460 comprises subpixels 441, 451 and 461 in a form of a single column.

Figure 4C:
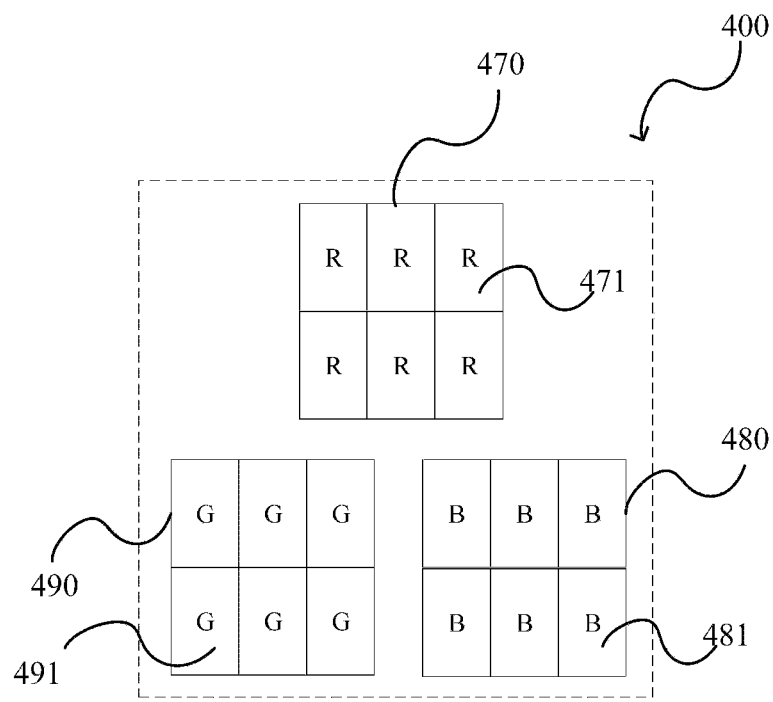

As shown in FIG. 4C, three composite subpixels 470, 480 and 490 in the composite pixel 400 are arranged in a shape of a Chinese character 'PIN'. In an embodiment shown in FIG. 4C, subpixels 471, 481 and 491 in the respective composite subpixels 470, 480 and 490 may be in a form of array (3×2).

Figure 1C:
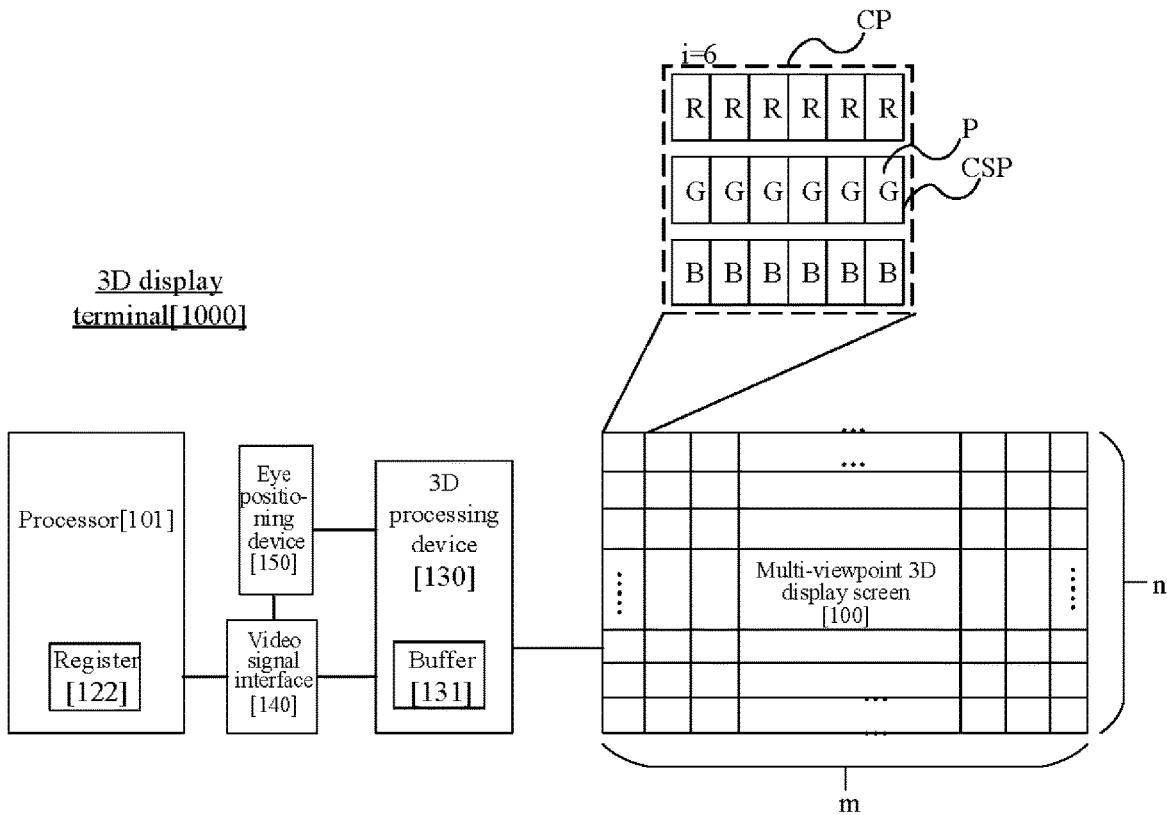
Figure 1D:
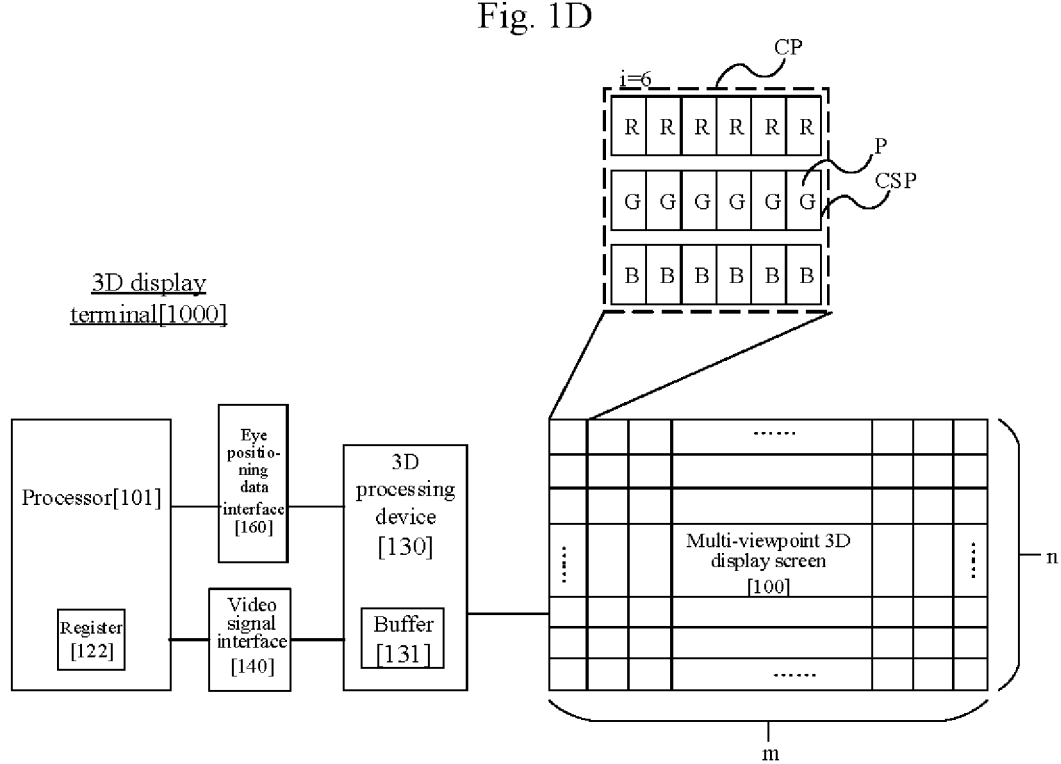

In some embodiments, for example, as shown in FIGS. 1A-1C, the 3D display terminal 1000 may be provided with a single 3D processing device 130. The single 3D processing device 130 is configured to simultaneously process the rendering for each composite subpixel of all the composite pixels of the large-sized 3D display screen 100.

Figure 6:
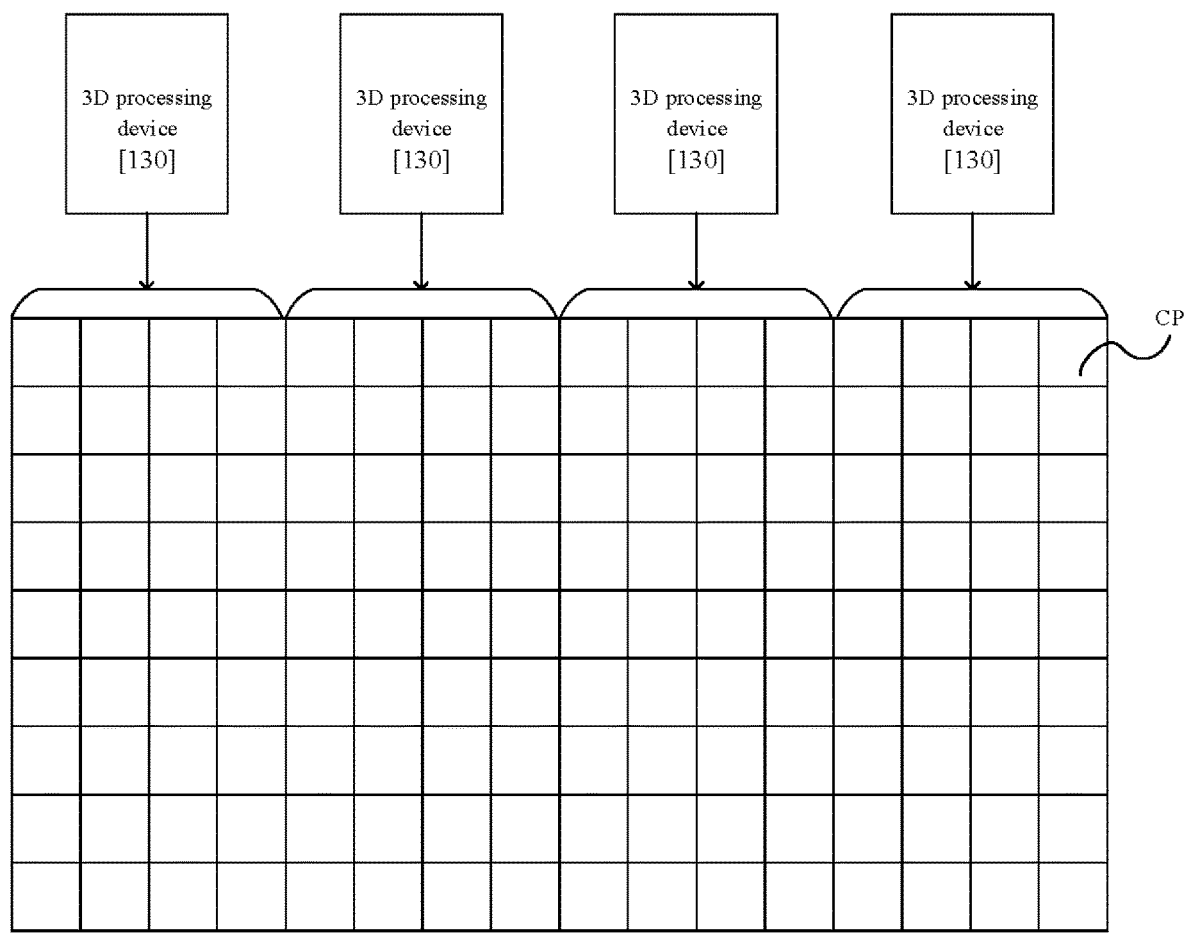
FIG. 6 is a schematic diagram of arranging at least two 3D processing devices provided by the embodiments of the present disclosure.

In some other embodiments, for example, as shown in FIG. 6, the 3D display terminal 1000 may be provided with at least two 3D processing devices 130 which are configured to process the rendering for each composite subpixel of all the composite pixels of the large-sized 3D display screen 100 in a parallel, serial or parallel-serial combination manner.

Those skilled in the art should understand that the at least two 3D processing devices may be distributed in other manners and are configured to parallelly process the multi-row and multi-column composite pixels or composite subpixels of the large-sized 3D display screen 100, which falls into the scope of the present invention.

In some embodiments, the at least one 3D processing device 130 may further selectively comprise a buffer 131, so as to buffer the received video frames.

In some embodiments, the at least one 3D processing device is a Field Programmable Gate Array (FPGA) chip or an Application Specific Integrated Circuit (ASIC) chip or an FPGA chipset or an ASIC chipset.

Continuing to refer to FIG. 1A, the 3D display terminal 1000 may further comprise a processor 101 which is in communication connection to the at least one 3D processing device 130 through the video signal interface 140. In some embodiments shown herein, the processor 101 is comprised in a computer or an intelligent terminal, such as a mobile terminal, or serves as a processor unit. However, it may be contemplated that in some embodiments, the processor 101 may be arranged at the outer part of the 3D display terminal, and for example, the 3D display terminal may be the multi-viewpoint 3D display screen provided with the 3D processing device, such as a non-intelligent 3D television.

Figure 2:
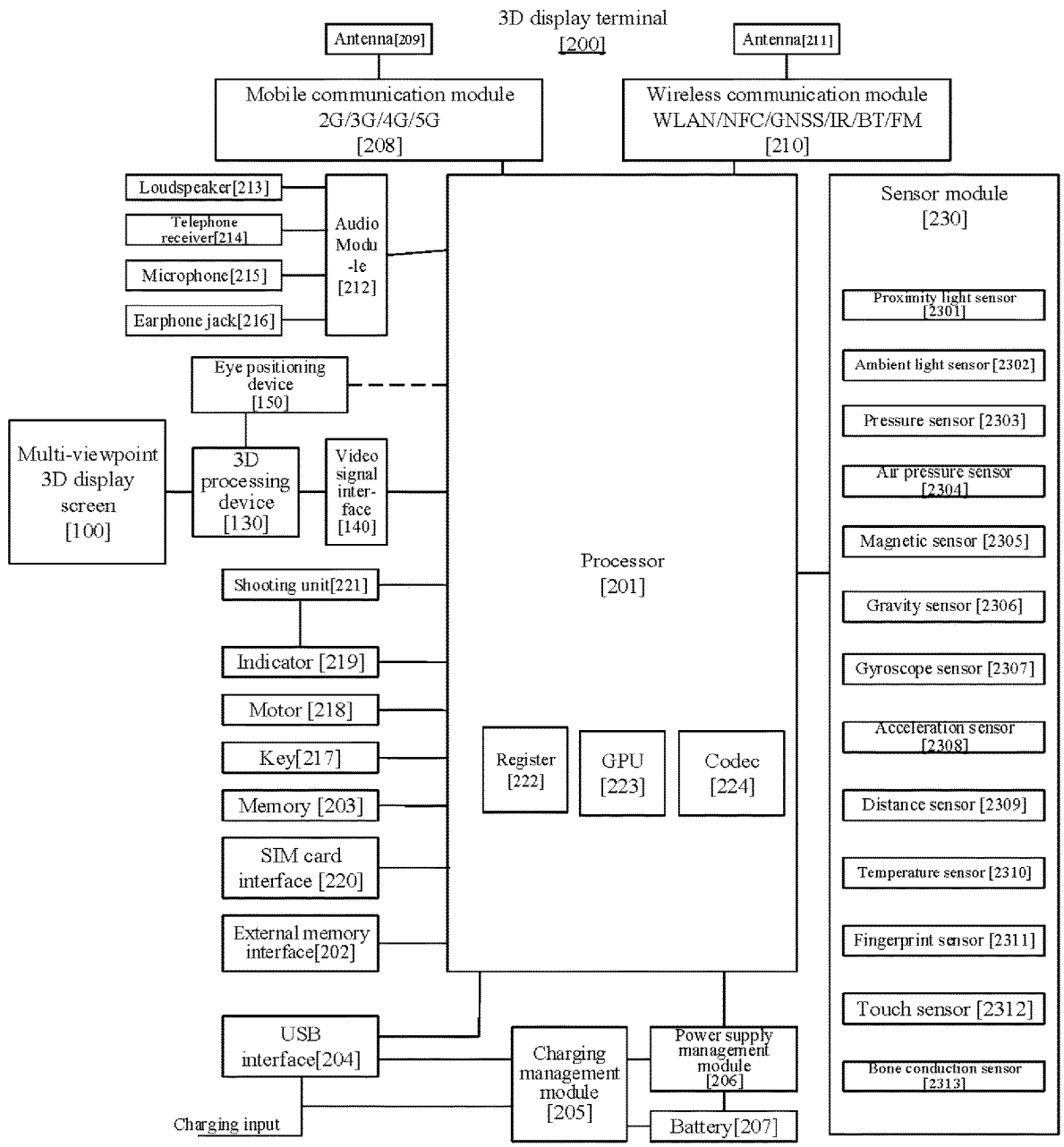
FIG. 2 is a structural schematic diagram of hardware of the 3D display terminal according to the embodiments of the present disclosure.
Figure 3:
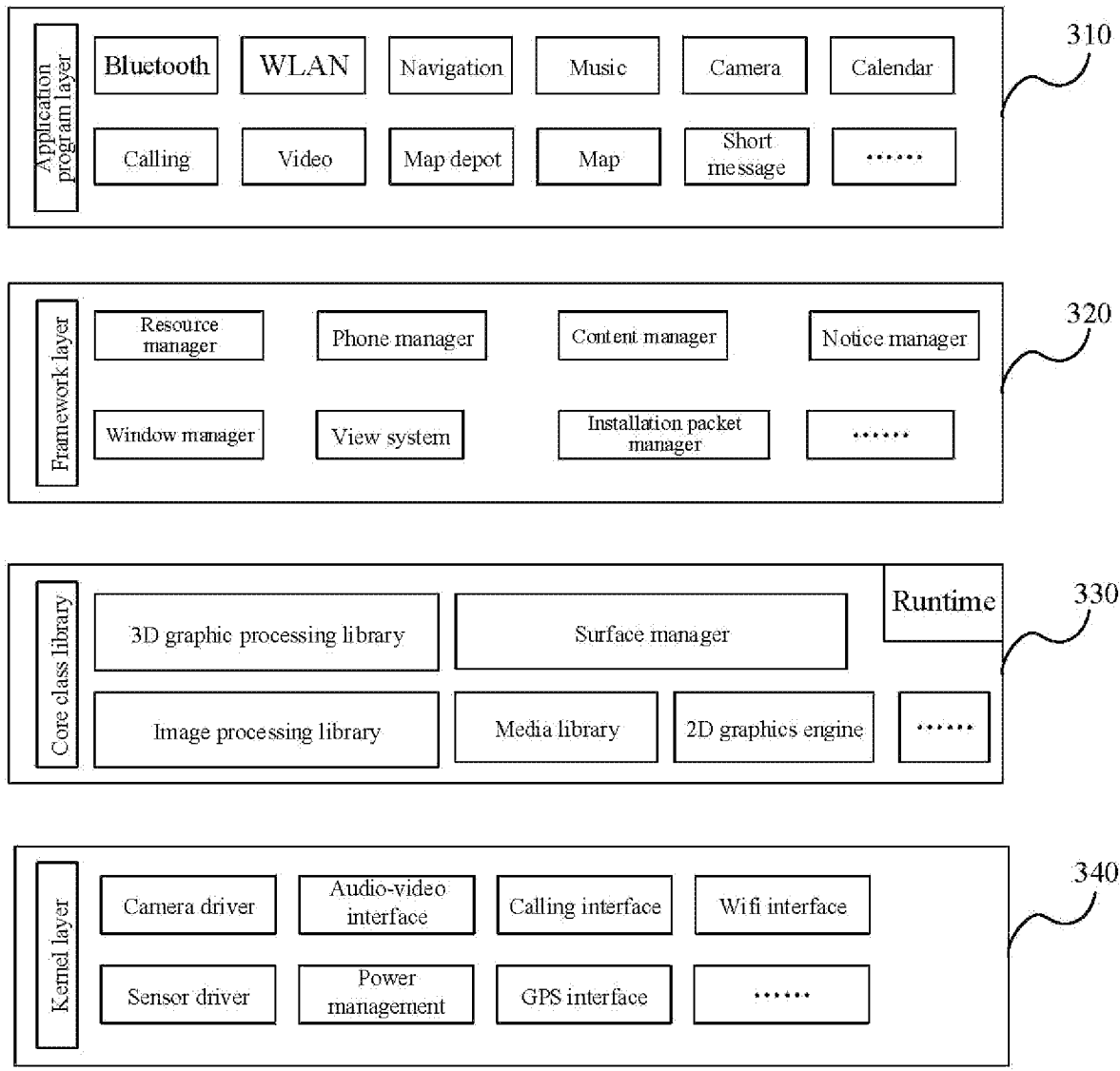
FIG. 3 is a structural schematic diagram of software of the 3D display terminal according to the embodiments of the present disclosure.

For simplicity, exemplary embodiments of the 3D display terminal hereinafter internally comprise the processor. Then, the video signal interface 140 is constructed as an internal interface for connecting the processor 101 and the 3D processing device 130, and the structure may be understood more clearly with reference to a 3D display terminal 200 implemented in a mobile terminal manner, which is shown in FIG. 2 and FIG. 3. In some embodiments of the present invention, the video signal interface 140 serving as the internal interface of the 3D display terminal 200 may be an MIPI, a mini-MIPI, an LVDS interface, a min-LVDS interface or a Display Port. In some embodiments, as shown in FIG. 1A, the processor 101 of the 3D display terminal 1000 may further comprise a register 122. The register 122 may be used for temporarily storing instructions, data and addresses.

In some embodiments, the 3D display terminal 1000 may further comprise an eye positioning device or an eye positioning data interface used for acquiring real-time eye positioning data, so that the 3D processing device 130 may be configured to render corresponding subpixels in the composite pixels (composite subpixels) based on the eye positioning data. For example, in an embodiment shown in FIG. 1B, the 3D display terminal 1000 further comprises an eye positioning device 150 which is in communication connection to the 3D processing device 130, so that the 3D processing device 130 may be configured to directly receive the eye positioning data. In an embodiment shown in FIG. 1C, for example, the eye positioning device (not shown) may be directly connected with the processor 101, while the 3D processing device 130 is configured to acquire the eye positioning data from the processor 101 through an eye positioning data interface 151. In some other embodiments, the eye positioning device may be simultaneously connected with the processor and the 3D processing device, so that on the one hand, the 3D processing device 130 may be configured to directly acquire the eye positioning data from the eye positioning device, and on the other hand, other information acquired by the eye positioning device may be processed by the processor.

With reference to FIGS. 1A-C and FIGS. 5A-E, the transmission and display of the 3D video signals in the 3D display terminal in some embodiments of the present disclosure are described. In the shown embodiments, the display screen 110 may define 6 viewpoints V1-V6, and the eyes of the user may view display of the corresponding subpixel in the composite subpixels of all the composite pixels in the display panel of the multi-viewpoint 3D display screen 110 at each viewpoint (a spatial position). Two different images viewed by the eyes of the user at different viewpoints form a parallax, and a 3D image is composited in a brain.

In some embodiments of the present disclosure, the 3D processing device 130 is configured to receive, for example, video frames of decompressed 3D video signals from the processor 101 through for example the video signal interface 140 serving as the internal interface. Each video frame may include two images with the resolution of m×n or include a composite image with the resolution of 2m×n or m×2n, or is composed thereof.

In some embodiments, the two images or the composite image may comprise different types of images and may be in various arrangement forms.

Figure 5A:
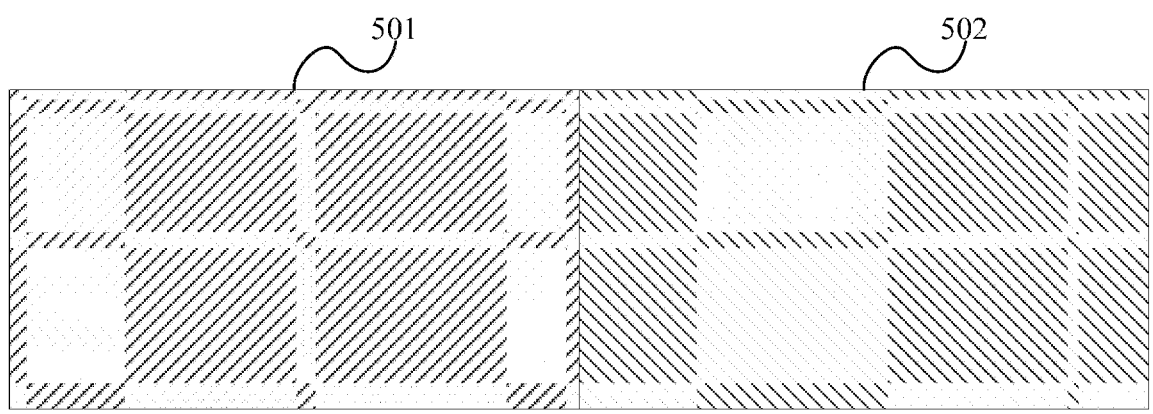
FIGS. 5A-5E are schematic diagrams of formats and contents of images included in video frames of 3D video signals according to the embodiments of the present disclosure.

As shown in FIG. 5A, each video frame of the 3D video signals includes two images 501 and 502 with the resolution of m×n, which are in a parallel format, or is composed of the two images 501 and 502. In some embodiments, the two images may be respectively a left eye parallax image and a right eye parallax image. In some embodiments, the two images may be respectively a rendered color image and a depth-of-field (DOF) image.

Figure 5B:
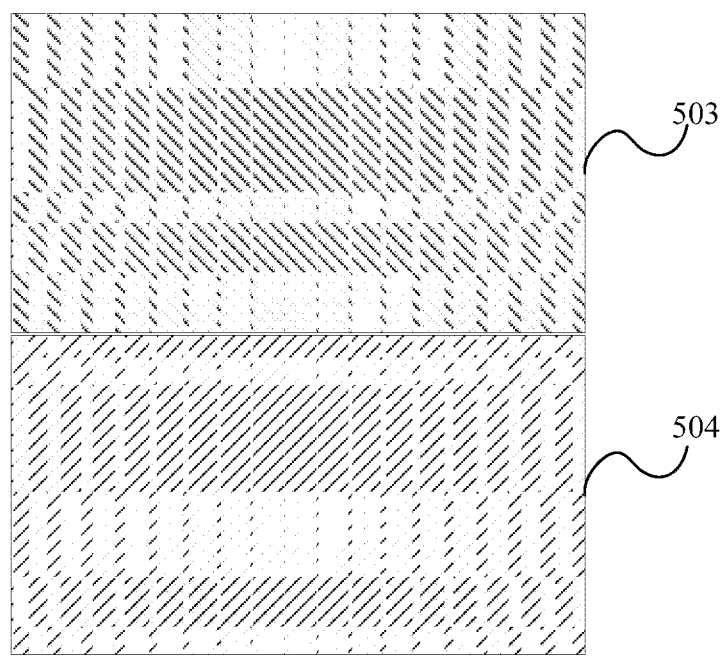

As shown in FIG. 5B, each video frame of the 3D video signals includes two images 503 and 504 with the resolution of m×n, which are in an up-down format, or is composed of the two images 503 and 504. In some embodiments, the two images may be respectively a left eye parallax image and a right eye parallax image. In some embodiments, the two images may be respectively a rendered color image and a DOF image.

Figure 5C:
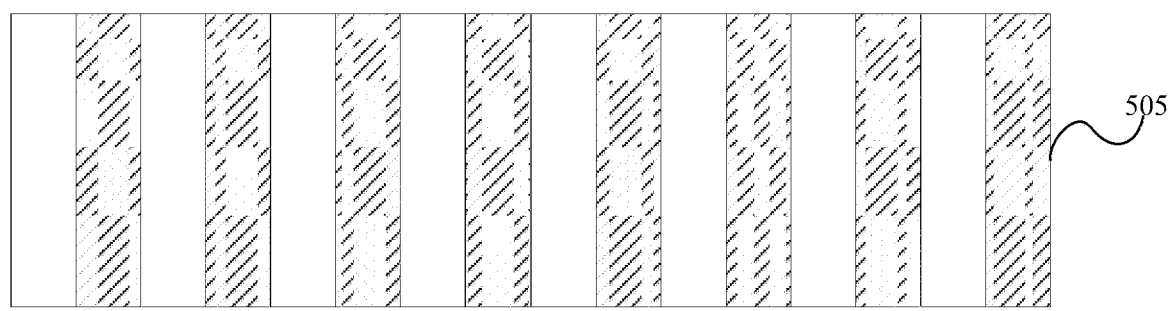

As shown in FIG. 5C, each video frame of the 3D video signals includes a composite image 505 with the resolution of 2m×n, which is in a left-right interlaced format. In some embodiments, the composite image may be a left eye and right eye parallax composite image in a left-right interlaced format and a rendered color and DOF composite image in a left-right interlaced format.

Figure 5D:
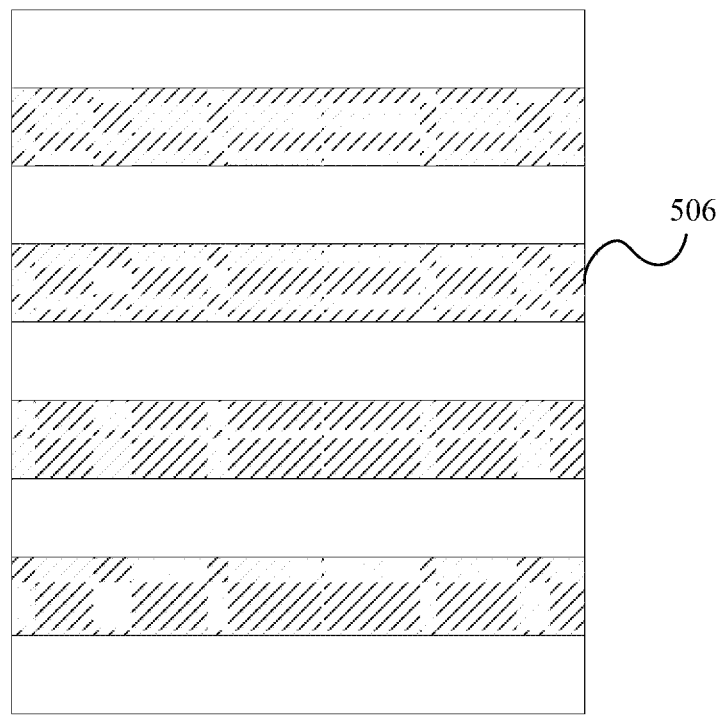

As shown in FIG. 5D, each video frame of the 3D video signals includes a composite image 506 with the resolution of m×2n, which is in an up-down interlaced format. In some embodiments, the composite image may be a left eye and right eye parallax composite image in an up-down interlaced format. In some embodiments, the composite image may be a rendered color and DOF composite image in an up-down interlaced format.

Figure 5E:
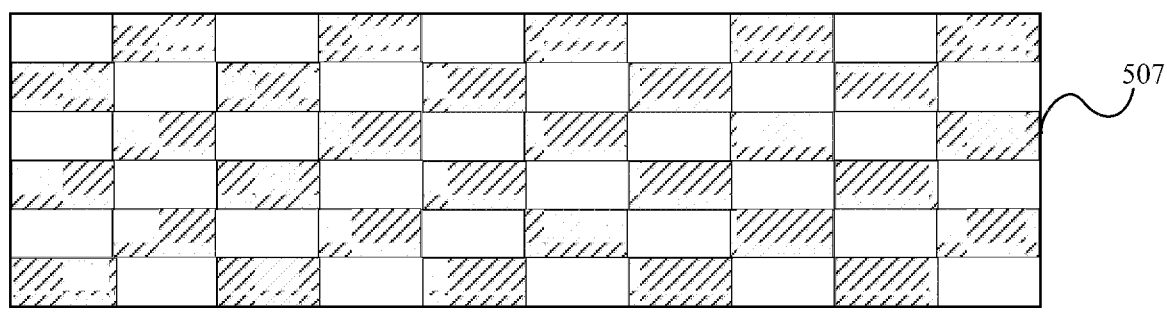

As shown in FIG. 5E, each video frame of the 3D video signals includes a composite image 507 with the resolution of 2m×n, which is in a checkerboard format. In some embodiments, the composite image may be a left eye and right eye parallax composite image in a checkerboard format. In some embodiments, the composite image may be a rendered color image and a DOF image in a checkerboard format.

Those skilled in the art will understand that the embodiments shown in the drawings are only schematic, and the two images or the composite image included in each video frame of the 3D video signals may comprise other types of images and may be in other arrangement forms, which falls into the scope of the present invention.

In some embodiments, the resolution of m×n may be resolution over Full High Definition (FHD), comprising but not limited to 1920×1080, 1920×1200, 2048×1280, 2560×1440, 3840×2160 and the like.

In some embodiments, after the video frames of the two images are received, the at least one 3D processing device 130 is configured to render at least one subpixel in each composite subpixel based on one of the two images and render at least another subpixel in each composite subpixel based on the other one of the two images. Similarly, in some embodiments, after the video frame comprising the composite image is received, the at least one 3D processing device is configured to render at least two subpixels in each composite subpixel based the composite image. For example, at least one subpixel is rendered according to a first image (part) in the composite image, and at least another subpixel is rendered according to a second image (part).

In some embodiments, this is, for example, dynamic rendering based on the eye positioning data.

As explanation but not limit, since in the two images included in data of the video frames received by the 3D processing device 130 in the embodiments of the present disclosure through, for example, the video signal interface 140 constructed as the internal interface, the resolution of each image (or a half of the resolution of the composite image) corresponds to the composite pixels (comprising the composite subpixels divided according to the viewpoints) divided according to the viewpoints. On the one hand, since information of the viewpoints is unrelated to a transmission process, the 3D display with a small calculating amount of processing and non-damaged resolution can be realized; and on the other hand, since the composite pixels (composite subpixels) are arranged correspondingly to the viewpoints, the rendering for the display screen can be realized in a 'point-to-point' manner, thereby greatly reducing the calculating amount. By contrast, the transmission and display of images or videos of a conventional 3D display screen are still based on a 2D display panel, the problems of reduction of the resolution and sharp increase of a calculating amount of rendering exist, and the problems of multiple times of format adjustment and display adaptation of the images or the videos further exist probably.

In some embodiments, the register 122 of the processor 101 may be used for receiving information related to display requirements of the multi-viewpoint 3D display screen 110, and the information is typically information unrelated to the i viewpoints and related to the resolution of m×n of the multi-viewpoint 3D display screen 110, so that the processor 101 is configured to send the video frames of the 3D video signals according with the display requirements thereof to the multi-viewpoint 3D display screen 110. For example, the information may be a data packet used for initially establishing video transmission and sending.

Therefore, when the video frames of the 3D video signals are transmitted, the processor 101 does not need to consider the information related to the i viewpoints of the multi-viewpoint 3D display screen 110 (i ≥ 3). However, the processor 101 can be configured to send the video frames of the 3D video signals according with the requirements thereof to the multi-viewpoint 3D display screen 110 by virtue of the information, related to the resolution of m×n of the multi-viewpoint 3D display screen 100, received by the register 122.

In some embodiments, the 3D processing device 130 is further configured to perform displacement rendering for subpixels in composite pixels according to viewpoint positions corresponding to subpixels rendered currently and next viewpoint positions corresponding to subpixels rendered in a next frame.

In some embodiments, the 3D display terminal 1000 may further comprise a codec, configured to decompress and code/decode compressed 3D video signals and send the decompressed 3D video signals to the at least one 3D processing device 130 through the video signal interface 140.

In some embodiments, the processor 101 of the 3D display terminal 1000 is configured to read the video frames of the 3D video signals from a memory or receive the video frames of the 3D video signals from, beyond the 3D display terminal 1000, for example, through an external interface, and transmit the read or received video frames of the 3D video signals to the at least one 3D processing device 130 through the video signal interface 140.

In some embodiments, the 3D display terminal 1000 further comprises a format adjuster (not shown), for example, integrated into the processor 101, constructed as the codec or serving as a part of a Graphic Processing Unit (GPU), and used for preprocessing the video frames of the 3D video signals, so that the two images included therein have the resolution of m×n or the composite image included therein has the resolution of 2m×n or m×2n.

As described above, the 3D display terminal provided by some embodiments of the present disclosure may be a 3D display terminal including a processor. In some embodiments, the 3D display terminal may be constructed as an intelligent cell phone, a tablet personal computer, a smart television, wearable equipment, vehicle-mounted equipment, a laptop, an Ultra-Mobile Personal Computer (UMPC), a netbook, a Personal Digital Assistant (PDA) and the like.

In another solution, a 3D display system is further provided, comprising a processor unit and the above 3D display terminal; and the processor unit is in communication connection with the 3D display terminal.

In some embodiments, the 3D display system is constructed as the smart television having the processor unit; or, the 3D display system is the intelligent cell phone, the tablet personal computer, a personal computer or the wearable equipment; or, the 3D display system comprises a Set Top Box (STB) serving as the processor unit or the cell phone/the tablet personal computer capable of realizing screen projection, and a digital television, serving as the 3D display terminal, which is in wired connection or wireless connection with the STB, the cell phone or the tablet personal computer; or, the 3D display system is constructed as an intelligent home system or a part thereof, wherein the processor unit comprises an intelligent gateway or a central control unit of the intelligent home system, and the intelligent home system further comprises the eye positioning device used for acquiring eye positioning data; or, the 3D display system is constructed as an entertainment interacting system or a part thereof.

Exemplarily, FIG. 2 shows a structural schematic diagram of hardware of the 3D display terminal 200 implemented as a large-sized mobile terminal. The 3D display terminal 200 may comprise a processor 201, an external memory interface 202, an (internal) memory 203, a Universal Serial Bus (USB) interface 204, a charging management module 205, a power supply management module 206, a battery 207, a mobile communication module 208, a wireless communication module 210, antennas 209 and 211, an audio module 212, a loudspeaker 213, a telephone receiver 214, a microphone 215, an earphone jack 216, a key 217, a motor 218, an indicator 219, a Subscriber Identity Module (SIM) card interface 220, the multi-viewpoint 3D display screen 110, the 3D processing device 130, the video signal interface 140, a shooting unit 221, the eye positioning device 150, a sensor module 230 and the like, wherein the sensor module 230 may comprise a proximity light sensor 2301, an ambient light sensor 2302, a pressure sensor 2303, an air pressure sensor 2304, a magnetic sensor 2305, a gravity sensor 2306, a gyroscope sensor 2307, an acceleration sensor 2308, a distance sensor 2309, a temperature sensor 2310, a fingerprint sensor 2311, a touch sensor 2312, a bone conduction sensor 2313 and the like.

It may be understood that the schematic structures of the embodiments of the present disclosure do not form specific limit to the 3D display terminal 200. In some other embodiments of the present disclosure, the 3D display terminal 200 may comprise components more or less than the components shown in the drawings, or certain components are combined, or certain components are split, or different components are arranged. The components shown in the drawings may be realized by the hardware, software or the combination of the software and the hardware.

The processor 201 may comprise one or more processing units, and for example, the processor 201 may comprise an Application Processor (AP), a modulation-demodulation processor, a baseband processor, a GPU 223, an Image Signal Processor (ISP), a controller, a memory, a codec 224, a Digital Signal Processor (DSP), a baseband processor, a Neural Network Processing Unit (NPU) and the like or a combination thereof, wherein different processing units may be independent devices, and may also be integrated in one or more processors.

The processor 201 may be further provided with a high-speed buffer, used for storing instructions or data just used or recycled by the processor 201. If the processor 201 needs to use the instructions or the data again, the instructions or the data may be directly called from the memory.

In some embodiments, the processor 201 may comprise one or more interfaces. The interface may comprise an integrated circuit (I2C) interface, an integrated circuit built-in audio (I2S) interface, a Pulse Code Modulation (PCM) interface, a Universal Asynchronous Receiver/Transmitter (UART) interface, a Mobile Industry Processor Interface (MIPI), a General Purpose Input/Output (GPIO) interface, a SIM interface, a USB interface and the like.

The I2C interface is a two-way synchronous serial bus, and comprises a Serial Data Line (SDA) and a Serial Clock Line (SCL). In some embodiments, the processor 201 may include a plurality of groups of I2C buses. The processor 201 may be in communication connection with the touch sensor 2312, a charger, a flash lamp, the shooting unit 221, the eye positioning device 150 and the like through different I2C bus interfaces respectively.

Both the I2S interface and the PCM interface may be used for audio communication.

The UART interface is a universal serial data bus, used for asynchronous communication. The bus may be a two-way communication bus. The bus is configured to convert to-be-transmitted data between serial communication and parallel communication. In some embodiments, the UART interface is used for connecting the processor 201 and the wireless communication module 210.

In an embodiment shown in FIG. 2, the MIPI may be used for connecting the processor 201 and the multi-viewpoint 3D display screen 110. Additionally, the MIPI may also be used for connecting peripheral devices, such as the shooting unit 221, the eye positioning device 150 and the like.

The GPIO interface may be configured by software. The GPIO interface may be configured as a control signal and may also be configured as a data signal. In some embodiments, the GPIO interface may be used for connecting the processor 201, the shooting unit 221, the multi-viewpoint 3D display screen 110, the wireless communication module 210, the audio module 212, the sensor module 230 and the like The USB interface 204 is an interface according with the USB standard specification, and specifically, may be a Mini USB interface, a Micro USB interface, a USB Type C interface and the like. The USB interface 204 may be used for connecting the charger for charging the 3D display terminal 200, and may also be used for transmitting data between the 3D display terminal 200 and peripheral equipment. The USB interface 204 may also be used for connecting an earphone, and audios are played by the earphone.

It may be understood that interface connection relationships between the modules, which are shown in the embodiments of the present disclosure, are only the schematic description, and do not form a limitation to the structure of the 3D display terminal 200.

A wireless communication function of the 3D display terminal 200 may be realized by the antennas 209 and 211, the mobile communication module 208, the wireless communication module 210, the modulation-demodulation processor or the baseband processor and the like.

The antennas 209 and 211 are used for emitting and receiving electromagnetic wave signals. Each antenna in the 3D display terminal 200 may be used for covering single or more communication bands. Different antennas may be further reused, so as to improve the utilization rate of the antennas.

The mobile communication module 208 may provide a solution of wireless communication comprising 2G/3G/4G/5G and the like, which is applied on the 3D display terminal 200. The mobile communication module 208 may comprise at least a wave filter, a switch, a power amplifier, a Low Noise Amplifier (LNA) and the like. The mobile communication module 208 may be configured to receive electromagnetic waves by the antenna 209, perform wave filtering, amplifying and the like for the received electromagnetic waves, and transmit the received electromagnetic waves to the modulation-demodulation processor for demodulation. The mobile communication module 208 may be further configured to amplify signals after being modulated by the modulation-demodulation processor, convert the amplified signals into the electromagnetic waves by the antenna 209 and radiate the electromagnetic waves out. In some embodiments, at least a part of functional modules of the mobile communication module 208 may be arranged in the processor 201. In some embodiments, at least a part of functional modules of the mobile communication module 208 and at least a part of modules of the processor 201 may be arranged in a same device.

The wireless communication module 210 may provide a solution of wireless communication comprising a Wireless Local Area Network (WLAN), Bluetooth (BT), a Global Navigation Satellite System (GNSS), Frequency Modulation (FM), a Near Field Communication (NFC) technology, an Infrared Radiation (IR) technology and the like, which is applied on the 3D display terminal 200. The wireless communication module 210 may be one or more devices integrated with at least one communication processing module.

The wireless communication module 210 is configured to receive electromagnetic waves by the antenna 211, perform FM and wave filtering for electromagnetic wave signals, and send the processed signals to the processor 201. The wireless communication module 210 may be further configured to receive to-be-sent signals from the processor 201, perform FM and amplifying for the received signals, convert the processed signals into electromagnetic waves by the antenna 211 and radiate the electromagnetic waves out.

In some embodiments, the antenna 209 of the 3D display terminal 200 is coupled with the mobile communication module 208, and the antenna 211 is coupled with the wireless communication module 210, so that the 3D display terminal 200 may realize communication with a network and other equipment through a wireless communication technology. The wireless communication technology may comprise a Global System for Mobile Communications (GSM), a General Packet Radio Service (GPRS), Code Division Multiple Access (CDMA), Wideband Code Division Multiple Access (WCDMA), Time Division-Synchronization Code Division Multiple Access (TD-SCDMA), Long Term Evolution (LIE), the BT, the GNSS, the WLAN, the NFC, the FM, and/or the IR technology and the like. The GNSS may comprise a Global Positioning System (GPS), a Global Navigation Satellite System (GLONASS), a Beidou Navigation Satellite System (BDS), a Quasi-Zenith Satellite System (QZSS) and/or a Satellite Based Augmentation System (SBAS).

In some embodiments, the external interface used for receiving the 3D video signals may comprise the USB interface 204, the mobile communication module 208, the wireless communication module 210 or the combination thereof. Additionally, other feasible interfaces used for receiving the 3D video signals, such as the above interfaces, may be further contemplated.

The memory 203 may be used for storing computer executable program codes, and the executable program codes comprise instructions. The processor 201 is configured to operate the instructions stored in the memory 203, so as to execute various function applications of the 3D display terminal 200 and data processing. The memory 203 may comprise a program storage area and a data storage area, wherein the program storage area may be configured to store an operation system, an application program required by at least one function (such as an audio playing function and an image playing function) and the like. The data storage area may be configured to store data (such as audio data and phone books) and the like that are established in a using process of the 3D display terminal 200. Additionally, the memory 203 may comprise a high-speed RAM (Random Access Memory), and may further comprise a nonvolatile memory, such as at least one disk storage device, a flash memory device, a Universal Flash Storage (UFS) and the like.

The external memory interface 202 may be used for connecting an external storage card, such as a Micro SD (Secure Digital) card, so as to extend the storage capacity of the 3D display terminal 200. The external storage card is in communication with the processor 201 through the external memory interface 202, so as to realize a data storage function.

In some embodiments, the memory of the 3D display terminal may comprise the (internal) memory 203, the external storage card connected with the external memory interface 202 or a combination thereof. In some other embodiments of the present disclosure, the video signal interface may also adopt different internal interface connection manners in the above embodiments or a combination thereof.

In some embodiments of the present disclosure, the shooting unit 221 may be configured to acquire images or videos.

In some embodiments, the 3D display terminal 200 realizes a display function through the video signal interface 140, the 3D processing device 130, the multi-viewpoint 3D display screen 110, the AP and the like.

In some embodiments, the 3D display terminal 200 may comprise the GPU, and for example, is used for processing 3D video images in the processor 201, and may also be used for processing 2D video images.

In some embodiments, the 3D display terminal 200 may further comprise the codec 224, used for compressing or decompressing digital videos.

In some embodiments, the video signal interface 140 is used for outputting the video frames of the 3D video signals, such as the decompressed 3D video signals, processed by the GPU or the codec 224 or the GPU and the codec 224, to the 3D processing device 130.

In some embodiments, the GPU or the codec 224 is integrated with the format adjuster.

The multi-viewpoint 3D display screen 110 is used for displaying 3D images or videos and the like. The multi-viewpoint 3D display screen 110 comprises the display panel. The display panel may adopt a Liquid Crystal Display (LCD), an Organic Light Emitting Diode (OLED), an Active Matrix/Organic Light Emitting Diode (AMOLED), a Flexible Light Emitting Diode (FLED), a Mini-LED, a Micro-LED, a Micro-OLED, a Quantum Dot Light Emitting Diode (QLED) and the like.

In some embodiments, the eye positioning device 150 is in communication connection with the 3D processing unit 130, so that the 3D processing unit 130 may be configured to render the corresponding subpixels in the composite pixels (composite subpixels) based on the eye positioning data. In some embodiments, the eye positioning device 150 may be further connected with the processor 201, and for example, a bypass is connected with the processor 201.

The 3D display terminal 200 may realize an audio function, such as music playing, recording and the like, through the audio module 212, the loudspeaker 213, the telephone receiver 214, the microphone 215, the earphone jack 216, the AP and the like. The audio module 212 is used for converting digital audio information into analog audio signals and outputting the analog audio signals, and is also used for inputting analog audios and converting the input analog audios into digital audio signals. The audio module 212 may be further used for coding and decoding the audio signals. In some embodiments, the audio module 212 may be arranged in the processor 201, or part of functional modules of the audio module 212 are arranged in the processor 201. The loudspeaker 213 is used for converting electrical audio signals into sound signals. The 3D display terminal 200 may be configured to listen in to music or hands-free calls through the loudspeaker 213. The telephone receiver 214, also called 'a handset', is used for converting the electrical audio signals into the sound signals. When the 3D display terminal 200 is used for answering the calls or voice information, the telephone receiver 214 may be close to ears to answer voices. The microphone 215 is used for converting the sound signals into electrical signals. The earphone jack 216 is used for connecting a wired headset. The earphone jack 216 may be the USB interface 204, and may also be an Open Mobile Terminal Platform (OMTP) standard interface of 3.5 mm and a Cellular Telecommunications Industry Association of America (CTIA) standard interface.

The key 217 comprises a power button, a volume button and the like. The key 217 may be a mechanical key, and may also be a touch key. The 3D display terminal 200 may be configured to receive key input, to generate key signal input related to user settings and functional control of the 3D display terminal 200.

The motor 218 may generate a vibration alert. The motor 218 may be used for the vibration alert for the calls, and may also be used for a touch vibration feedback.

The SIM card interface 220 is used for connecting an SIM card. In some embodiments, the 3D display terminal 200 adopts an eSIM, i.e. an embedded SIM card.

The pressure sensor 2303 is used for feeling pressure signals, and may be used for converting the pressure signals into electrical signals. In some embodiments, the pressure sensor 2303 may be arranged in the multi-viewpoint 3D display screen 110, which falls into the scope of the present invention.

The air pressure sensor 2304 is used for measuring air pressure. In some embodiments, the 3D display terminal 200 is configured to calculate altitude through an air pressure value measured by the air pressure sensor 2304, so as to assist positioning and navigation.

The magnetic sensor 2305 comprises a Hall sensor.

The gravity sensor 2306 is a sensor for converting movement or gravity into electrical signals, and is mainly used for measuring parameters such as an inclination angle, inertia force, impact, vibration and the like.

The gyroscope sensor 2307 may be used for determining a moving posture of the 3D display terminal 200.

The acceleration sensor 2308 may be used for detecting a size of an acceleration of the 3D display terminal 200 in each direction (three axes in general).

The distance sensor 2309 may be used for measuring a distance.

The temperature sensor 2310 may be used for detecting temperature.

The fingerprint sensor 2311 is used for acquiring fingerprints. The 3D display terminal 200 may realize fingerprint unlocking, access to an application lock, fingerprint shooting, fingerprint answering of the calls and the like by utilizing the acquired fingerprints.

The touch sensor 2312 may be arranged in the multi-viewpoint 3D display screen 110, and the touch sensor 2312 and the multi-viewpoint 3D display screen 110 form a touch screen, also called 'a touch control screen'.

The bone conduction sensor 2313 may be used for acquiring vibration signals.

The charging management module 205 is used for receiving charging input from the charger, wherein the charger may be a wireless charger, and may also be a wired charger. In some embodiments of wired charging, the charging management module 205 may be configured to receive charging input of the wired charger through the USB interface 204. In some embodiments of wireless charging, the charging management module 205 may be configured to receive wireless charging input through a wireless charging coil of the 3D display terminal 200.

The power supply management module 206 is used for connecting the battery 207, the charging management module 205 and the processor 201. The power supply management module 206 is configured to receive input of the battery 207 and/or the charging management module 205, so as to supply power for the processor 201, the memory 203, an external memory, the multi-viewpoint 3D display screen 110, the shooting unit 221, the wireless communication module 210 and the like. In some other embodiments, the power supply management module 206 and the charging management module 205 may also be arranged in a same device.

A software system of the 3D display terminal 200 may adopt a layered architecture, an event-driven architecture, a micro-kernel architecture, a micro-service architecture, or a cloud architecture. The embodiments shown in the present disclosure take an Android system in the layered architecture as an example, and exemplarily illustrate a software structure of the 3D display terminal 200. However, it may be contemplated that the embodiments of the present disclosure may be implemented in different software systems, such as an operating system.

FIG. 3 is a structural schematic diagram of software of the 3D display terminal 200 according to the embodiments of the present disclosure. The software is divided into a plurality of layers by the layered architecture. The communication between the layers is realized through a software interface. In some embodiments, the Android system is divided into four layers, comprising an application program layer 310, a framework layer 320, a core class library and Runtime 330 and a kernel layer 340 from top to bottom in sequence.

The application program layer 310 may comprise a series of application program packets. As shown in FIG. 3, the application program packets may comprise application programs such as BT, WLAN, navigation, music, a camera, a calendar, calling, a video, a map depot, a map, a short message and the like. A 3D video display method according to the embodiments of the present disclosure, for example, may be implemented in a video application program.

The framework layer 320 is configured to provide Application Programming Interfaces (APIs) and programming frameworks for the application programs of the application program layer. The framework layer comprises some pre-defined functions. For example, in some embodiments of the present disclosure, functions or algorithms for identifying the acquired 3D video images, algorithms for processing the images and the like may be included in the framework layer.

As shown in FIG. 3, the framework layer 320 may comprise a resource manager, a phone manager, a content manager, a notice manager, a window manager, a view system, an installation packet manager and the like.

Android Runtime comprises a core library and a virtual machine. The Android Runtime is in charge of scheduling and management of the Android system.

The core library includes two parts: one part is a functional function that a java language needs to call, and the other part is an Android core library.

The application program layer and the framework layer operate in the virtual machine. The virtual machine is configured to execute java files of the application program layer and the framework layer to binary files. The virtual machine is used for executing functions such as management for an object life cycle, stack management, thread management, management for security and abnormity, garbage collection and the like.

The core class library may comprise a plurality of functional modules, such as: a 3D graphic processing library (such as an Open Graphics Library Expert System (OpenGL ES)), a surface manager, an image processing library, a media library, a graphics engine (such as: a Skia Graphics Library (SGL)) and the like.

The kernel layer 340 is a layer between the hardware and the software. The kernel layer at least includes a camera driver, an audio-video interface, a calling interface, a Wifi interface, a sensor driver, power management and a GPS interface.

Here, the 3D display terminal, serving as the mobile terminal, in a structure shown in FIG. 2 and FIG. 3 is taken as an example, and an embodiment of 3D video transmission and display in the 3D display terminal is described; however, it may be contemplated that more or less features may be comprised or the features therein are changed in some other embodiments.

In some embodiments, for example, the 3D display terminal 200, such as the intelligent cell phone or the tablet personal computer, serving as the mobile terminal, is configured to receive, for example the compressed 3D video signals, from the network, such as a cellular network, a WLAN network and BT, for example by virtue of the mobile communication module 208 and the antenna 209 or the wireless communication module 210 and the antenna 221, serving as external interfaces; image processing is performed for the compressed 3D video signals, for example by the GPU 223, and the processed 3D video signals are coded/decoded and decompressed by the codec 224; then the decompressed 3D video signals are sent to the at least one 3D processing device 130, for example through the video signal interface 140, such as the MIPI or the mini-MIPI, serving as the internal interface; and each video frame of the decompressed 3D video signals comprises the two images or the composite image of the embodiments of the present disclosure. Then, the 3D processing device 130 is configured to correspondingly render the subpixels in the composite subpixels of the display screen, so as to realize 3D video playing.

In some other embodiments, the 3D display terminal 200 is configured to read the (internal) memory 203 or read the compressed 3D video signals stored in the external storage card by the external memory interface 202, and the 3D video playing is realized through corresponding processing, transmission and rendering.

In some embodiments, the above 3D video playing is implemented in the video application program in the application program layer 310 of the Android system.

In some embodiments, each video frame of the above 3D video signals includes a composite image with the resolution of 2m×n or m×2n, so that after the video frames of the above 3D video signals are transmitted, at least two subpixels in each composite subpixel of all the composite pixels of the multi-viewpoint 3D display screen 110 are rendered based on the composite images.

In some embodiments, the 3D display terminal 200 may comprise the eye positioning device or may read the eye positioning data, so as to acquire or read real-time eye positioning data of the user, so that dynamic rendering for the multi-viewpoint 3D display screen 110 is realized.

The equipment, the devices, the modules or the units illustrated in the above embodiments may be realized by various possible entities. A typical realizing entity is the computer or the processor thereof or other components. Specifically, the computer, for example, may be the personal computer, a laptop computer, vehicle-mounted human-computer interaction equipment, the cell phone, a camera phone, an intelligent phone, the PDA, a media player, navigation equipment, E-mail equipment, a game console, the tablet personal computer, the wearable equipment, the smart television, an Internet of Things (IoT) system, smart home, an industrial computer, a singlechip system or a combination thereof. In a typical configuration, the computer may comprise one or more Central Processing Units (CPUs), an input/output interface, a network interface and a memory. The memory probably comprises a volatile memory, an RAM and/or a nonvolatile memory and other forms in a computer readable medium, such as a Read Only Memory (ROM) or a flash RAM.

The method, the programs, the equipment, the devices and the like in the embodiments of the present invention may be executed or realized in one or more networked computers, and may also be implemented in distributed computing environments. In the embodiments of the description, in the distributed computing environments, tasks are executed by remote processing equipment connected by a communication network.

Those skilled in the art should understand that the embodiments of the description may provide the method, the equipment or computer program products. Therefore, the embodiments of the description may adopt forms of full-hardware embodiments, full-software embodiments or embodiments combining software and hardware aspects.

Those skilled in the art may contemplate that the functional modules/units or the controller and related method steps, illustrated in the above embodiments, may be realized in a software manner, a hardware manner and a software/hardware combination manner, and for example, may be realized in a pure computer readable program code manner, and logic programming can also be performed for part or all of the method steps to enable the controller to realize same functions by the hardware, comprising but not limited to a logic gate, a switch, a special integrated circuit, a Programmable Logic Controller (PLC) (such as the FPGA) and an embedded microcontroller.

In some embodiments of the present invention, the components of the devices are described in a form of the functional modules/units. It may be contemplated that a plurality of functional modules/units are realized in one or more 'combined' functional modules/units and/or one or more software and/or hardware. It may also be contemplated that the single functional module/unit is realized by the combination of a plurality of sub-functional modules/sub-units and/or multiple software and/or hardware. The division of the functional modules/units may be only a logic function division, and in a specific realizing manner, the plurality of functional modules/units may be combined or may be integrated into another system. Additionally, the connection of the modules, the units, the devices, the systems and the components thereof in the text comprises direct or indirect connection, covering feasible electrical, mechanical and communication connection, especially comprising wired or wireless connection between various interfaces, comprising but not limited to a High-Definition Multimedia Interface (HDMI), thunders, the USB, the WiFi and the cellular network.

In the embodiments of the present invention, the technical features, the flow charts and/or the block diagrams of the method and the programs may be applied in the corresponding devices, equipment and systems as well as the modules, the units and the components thereof. On the contrary, all the embodiments and features of the devices, the equipment, the systems as well as the modules, the units and the components thereof may be applied in the method and the programs according to the embodiments of the present invention. For example, a computer program instruction may be loaded in a general-purpose computer, a special computer, an embedded processor or a processor of other programmable data processing equipment to generate a machine which has corresponding functions or features realized in one program or more programs of the flow charts and/or one block or more blocks of the block diagrams.

The method and the programs according to the embodiments of the present invention may be stored in a computer readable memory or medium which can guide the computer or other programmable data processing equipment to work in a specific manner by way of the computer program instructions or programs. The embodiments of the present invention also relate to the readable memory or medium which stores the method, the programs and the instructions which can implement the embodiments of the present invention.

A storage medium comprises permanent and impermanent articles and mobile and immobile articles that may be used for realizing information storage by any method or technology. The information may be modules of a computer readable instruction, a data structure and a program or other data. Examples of the storage medium comprise, but not limited to a Phase-Change Random Access Memory (PRAM), a Static Random Access Memory (SRAM), a Dynamic Random Access Memory (DRAM), other types of RAMs, ROMs, Electrically Erasable Programmable Read-Only Memories (EEPROMs), flash memories or other memory technologies, Compact Disc Read-Only Memories (CD-ROMs) and Digital Video Disks (DVDs) or other optical memories and magnetic cassette tapes, and tape disk storage equipment or other magnetic storage equipment or any other non-transmission medium may be used for storing information which may be accessed by calculating equipment.

Unless clearly pointed out, actions or steps of the method and the programs recorded according to the embodiments of the present invention are not necessarily executed according to a specific sequence, and an expected result may still be realized. In some implementation manners, multitasking and parallel processing are also permissible or are probably favorable.

In the text, multiple embodiments of the present invention are described, but for simplicity, the description for all the embodiments is not elaborate, and same and similar features or parts between the embodiments are probably neglected. In the text, 'an embodiment', 'some embodiments', 'examples', 'specific examples' or 'some examples' refer to being suitable for at least one embodiment or example according to the present invention, rather than all the embodiments. The above terms are not necessarily meant to refer to the same embodiment or example. In addition, the specific features, structures, materials or characteristics of all the embodiments may be combined in a proper manner in any one or more embodiments or examples. Additionally, under the condition of no mutual contradiction, those skilled in the art may combine and integrate different embodiments or examples and the features of the different embodiments or examples, which are described in the description.

In the text, the term 'comprise', 'include' or a variant thereof refers to a covering form, rather than an exhaustive form, so that the process, the method, the products or the equipment, comprising a series of elements, may comprise the elements, and non-exclusively, may further comprise other elements that are not listed clearly. For the purpose of the disclosure and unless specifically described, 'one' refers to 'one or more'. The term 'comprise' or 'comprised' used in the description and the claims is non-exclusive, which is similar to 'include' to a certain degree, because the terms, when serving as transitional conjunctions, are explanatory. Additionally, the used term 'or' (such as A or B) refers to 'A or B, or A and B'. When an applicant intends to indicate 'only A or B, rather than A and B', 'only A or B, rather than A and B' will be used. Therefore, the use of the term 'or' is included, rather than non-exclusive.

The exemplary system and method of the present invention are specifically shown and described with reference to the above embodiments, and are only optimal modes of examples for implementing the system and the method. Those skilled in the art may understand that when the system and/or the method is implemented, various changes may be made to the embodiments of the system and the method described here, without departing from the spirit and the scope, defined in the attached claims, of the present invention. The attached claims are intended to define the scope of the system and the method, and therefore, the system and the method, falling in the claims and being equivalent thereto, may be covered. The above illustration for the system and the method should be understood to comprise all combinations of new and non-obvious elements described here, while the claims relating to any combination of the new and non-obvious elements may exist in the present disclosure or the follow-up application. Additionally, the above embodiments are exemplary, and in all possible combinations that may be claimed in the present disclosure or the follow-up application, no single feature or element is essential.

What is claimed is:

1. A multi-viewpoint 3D display screen, comprising:
   a display panel, comprising a plurality of composite pixels, wherein each composite pixel of the plurality of composite pixels comprises a plurality of composite subpixels, and each composite subpixel of the plurality of composite subpixels comprises a plurality of subpixels corresponding to a plurality of viewpoints of the multi-viewpoint 3D display screen; and
   a grating, directly bonded to the display panel;
   wherein a width p of each subpixel of the plurality of subpixels is constructed as:

$p \leq (d \times q)(n \times D)$, wherein d represents a sum of a thickness of the display panel and a thickness of the grating; q represents a reference distance of an interpupillary distance, D represents a preset viewing distance of the multi-viewpoint 3D display screen, and n represents a refractive index of the grating.

2. The multi-viewpoint 3D display screen according to claim 1, wherein $1.3 \leq n \leq 1.6$.

3. The multi-viewpoint 3D display screen according to claim 2, wherein $n=1.46$.

4. The multi-viewpoint 3D display screen according to claim 1, wherein each composite subpixel comprises a plurality of subpixels that are arranged in a single row or a single column; or
   each composite subpixel comprises a plurality of subpixels that are arranged in a form of array.

5. The multi-viewpoint 3D display screen according to claim 1, wherein the plurality of composite subpixels comprise at least one of red composite subpixels, green composite subpixels and blue composite subpixels.

6. The multi-viewpoint 3D display screen according to claim 1, wherein a size of the multi-viewpoint 3D display screen is greater than or equal to 43 inches.

7. The multi-viewpoint 3D display screen according to claim 6, wherein a size of the multi-viewpoint 3D display screen is 55 inches, 60 inches, 80 inches or 100 inches; or the multi-viewpoint 3D display screen is a cinema screen.

8. The multi-viewpoint 3D display screen according to claim 7, wherein a width of each subpixel of the plurality of subpixels is less than 0.008 mm.

9. The multi-viewpoint 3D display screen according to claim 8, wherein a width of each subpixel of the plurality of subpixels is less than 0.0076 mm.

10. The multi-viewpoint 3D display screen according to claim 1, wherein the display panel comprises:
    a first substrate;
    a second substrate, arranged at an interval with the first substrate;
    a color filter, attached to a surface, facing the second substrate, of the first substrate;
    a Thin Film Transistor (TFT), attached to a surface, facing the first substrate, of the second substrate;
    a polarizer, attached to a surface, away from the first substrate, of the second substrate; and
    a liquid crystal layer, arranged between the first substrate and the second substrate,
    wherein the grating is directly bonded to a surface, away from the second substrate, of the first substrate.

11. The multi-viewpoint 3D display screen according to claim 10, wherein the grating is obliquely bonded to the display panel.

12. The multi-viewpoint 3D display screen according to claim 11, wherein the grating comprises a plurality of cylindrical prism gratings.

13. A 3D display terminal, comprising a multi-viewpoint 3D display screen, wherein the multi-viewpoint 3D display screen comprises:
    a display panel, comprising a plurality of composite pixels, wherein each composite pixel of the plurality of composite pixels comprises a plurality of composite subpixels, and each composite subpixel of the plurality of composite subpixels comprises a plurality of subpixels corresponding to a plurality of viewpoints of the multi-viewpoint 3D display screen; and
    a grating, directly bonded to the display panel;
    wherein a width p of each subpixel of the plurality of subpixels is constructed as:

$p \leq (d \times g)/(n \times D)$.

wherein d represents a sum of a thickness of the display panel and a thickness of the grating; q represents a reference distance of an interpupillary distance; D represents a preset viewing distance of the multi-viewpoint 3D display screen; and n represents a refractive index of the grating.

14. The 3D display terminal according to claim 13, further comprising a 3D processing device, configured to render corresponding subpixels in the plurality of composite subpixels in the multi-viewpoint 3D display screen based on 3D signals.

15. The 3D display terminal according to claim 14, wherein the 3D processing device is further configured to perform displacement rendering for subpixels in composite subpixels according to viewpoint positions corresponding to subpixels rendered currently and viewpoint positions corresponding to subpixels rendered subsequently.

16. The 3D display terminal according to claim 13, further comprising a memory, configured to store corresponding relationships of subpixels and viewpoints,
    wherein the 3D processing device is configured to acquire the corresponding relationships.

17. The 3D display terminal according to claim 13, further comprising an eye positioning data acquisition device, configured to acquire eye positioning data of a user.

18. The 3D display terminal according to claim 13, wherein $1.3 \leq n \leq 1.6$.

* * * * *